US009558762B1

(12) United States Patent
Sieracki

(10) Patent No.: US 9,558,762 B1
(45) Date of Patent: *Jan. 31, 2017

(54) SYSTEM AND METHOD FOR DISTINGUISHING SOURCE FROM UNCONSTRAINED ACOUSTIC SIGNALS EMITTED THEREBY IN CONTEXT AGNOSTIC MANNER

(75) Inventor: Jeffrey M. Sieracki, Silver Spring, MD (US)

(73) Assignee: Reality Analytics, Inc., New York, NY (US)

(*) Notice: Subject to any disclaimer, the term of this patent is extended or adjusted under 35 U.S.C. 154(b) by 359 days.

This patent is subject to a terminal disclaimer.

(21) Appl. No.: 13/541,592

(22) Filed: Jul. 3, 2012

Related U.S. Application Data

(60) Provisional application No. 61/504,221, filed on Jul. 3, 2011.

(51) Int. Cl.
*G10L 25/00* (2013.01)
*G10L 15/00* (2013.01)
(Continued)

(52) U.S. Cl.
CPC .......... *G10L 25/00* (2013.01); *G06K 9/00161* (2013.01); *G06K 9/00523* (2013.01); *G10L 13/00* (2013.01);
(Continued)

(58) Field of Classification Search
CPC ....... H05K 999/99; G10L 15/10; G10L 15/00; G10L 15/02; G10L 25/00
(Continued)

(56) References Cited

U.S. PATENT DOCUMENTS 5,502,764 A 3/1996 Naccache
5,638,486 A * 6/1997 Wang et al. ................. 704/236
(Continued)

FOREIGN PATENT DOCUMENTS

EP 1371958 12/2003
WO 2008142386 A1 11/2008
WO 2009114721 A2 12/2009

OTHER PUBLICATIONS

Benedetto, J., et al.; "Wavelet packets for multi- and hyper-spectral imagery"; IS&T/SPIE Electronic Imaging 2010, Wavelet Applications in Industrial Processing VII, 7535 (2010).
(Continued)

*Primary Examiner* — Fariba Sirjani
(74) *Attorney, Agent, or Firm* — Rosenberg, Klein & Lee

(57) ABSTRACT

A system and method are provided for distinguishing between a plurality of sources based upon unconstrained acoustic signals captured therefrom. A spectrographic transformation is applied to time-captured segments of acoustic signals to generate a spectral vector for each. A selectively executed sparse decomposition includes in a training system mode simultaneous sparse approximation upon a joint corpus of spectral vectors for a plurality of acoustic signal segments from distinct sources. At least one sparse decomposition is executed for each spectral vector in terms of a representative set of decomposition atoms. Discriminant reduction executes during the training system mode to down-select from the representative set an optimal combination of atoms for cooperatively distinguishing acoustic signals emitted by different distinct sources. Classification is subsequently executed upon the sparse decomposition of an input acoustic signal segment unit to discover a degree of correlation for the input acoustic signal segment relative to each distinct source.

32 Claims, 16 Drawing Sheets

(51) Int. Cl.
  *G10L 15/02* (2006.01)
  *G10L 15/10* (2006.01)
  *G10L 13/00* (2006.01)
  *G06K 9/00* (2006.01)
  *G10L 17/00* (2013.01)

(52) U.S. Cl.
  CPC .............. *G10L 15/00* (2013.01); *G10L 15/02* (2013.01); *G10L 15/10* (2013.01); *G10L 17/00* (2013.01)

(58) Field of Classification Search
  USPC ....................................................... 704/237
  See application file for complete search history.

(56) References Cited

U.S. PATENT DOCUMENTS

| | | | |
|---|---|---|---|
| 5,699,121 A | 12/1997 | Zakhor et al. | |
| 5,764,921 A | 6/1998 | Banham et al. | |
| 6,016,546 A | 1/2000 | Kephart et al. | |
| 6,178,261 B1* | 1/2001 | Williams | G06K 9/522 382/190 |
| 6,587,507 B1 | 7/2003 | Chui et al. | |
| 6,625,213 B2 | 9/2003 | Bottreau et al. | |
| 6,628,300 B2* | 9/2003 | Amini et al. | 345/660 |
| 6,751,498 B1 | 6/2004 | Greenberg et al. | |
| 6,944,222 B2 | 9/2005 | Van Der Schaar | |
| 6,952,662 B2 | 10/2005 | Wegerich et al. | |
| 6,985,526 B2 | 1/2006 | Bottreau et al. | |
| 7,003,039 B2 | 2/2006 | Zakhor et al. | |
| 7,006,567 B2 | 2/2006 | Frossard et al. | |
| 7,020,701 B1 | 3/2006 | Gelvin et al. | |
| 7,079,986 B2 | 7/2006 | Sieracki | |
| 7,120,587 B2 | 10/2006 | Heusdens et al. | |
| 7,149,320 B2* | 12/2006 | Haykin et al. | 381/320 |
| 7,245,659 B2 | 7/2007 | Sekiguchi et al. | |
| 7,386,527 B2* | 6/2008 | Harris | G06K 9/6269 706/12 |
| 7,475,013 B2* | 1/2009 | Rifkin | 704/238 |
| 7,511,643 B2 | 3/2009 | Baraniuk et al. | |
| 7,526,645 B2 | 4/2009 | Miyazaki et al. | |
| 7,552,030 B2 | 6/2009 | Guralnik et al. | |
| 8,298,140 B2* | 10/2012 | Beck-Nielsen et al. | 600/300 |
| 8,463,719 B2* | 6/2013 | Lyon et al. | 706/12 |
| 8,706,276 B2* | 4/2014 | Ellis | G10L 25/54 700/94 |
| 8,805,083 B1* | 8/2014 | Sieracki | G06K 9/723 382/190 |
| 2003/0058339 A1 | 3/2003 | Trajkovic et al. | |
| 2003/0195429 A1* | 10/2003 | Wilson | 600/544 |
| 2004/0231498 A1* | 11/2004 | Li et al. | 84/634 |
| 2005/0149296 A1* | 7/2005 | Sieracki | G06K 9/00523 702/189 |
| 2006/0058998 A1* | 3/2006 | Yamamoto | G10L 17/00 704/254 |
| 2006/0064037 A1 | 3/2006 | Shalon et al. | |
| 2006/0241916 A1* | 10/2006 | Sieracki | G10L 25/00 702/19 |
| 2007/0156471 A1 | 7/2007 | Moghaddam et al. | |
| 2007/0232958 A1 | 10/2007 | Donofrio et al. | |
| 2007/0271224 A1* | 11/2007 | Essafi | G06F 17/3002 |
| 2008/0170623 A1* | 7/2008 | Aharon et al. | 375/240.22 |
| 2008/0228446 A1 | 9/2008 | Baraniuk et al. | |
| 2009/0072985 A1 | 3/2009 | Patel et al. | |
| 2010/0016752 A1* | 1/2010 | Sieracki | G10L 13/00 600/544 |
| 2012/0101826 A1* | 4/2012 | Visser | G10L 25/48 704/500 |
| 2012/0259442 A1* | 10/2012 | Jin | H04S 7/30 700/94 |
| 2012/0303557 A1* | 11/2012 | Lu | G06F 17/30616 706/12 |
| 2014/0201126 A1* | 7/2014 | Zadeh et al. | 706/52 |

OTHER PUBLICATIONS

Bergeaud, F., et al.; "Matching Pursuit of Images"; ICIP '95 Proceedings of the 1995 International Conference on Image Processing (vol. 1).

Bijaoui, A; "Multispectral Analysis based on Wavelet Fusion & Sparse Decomposition"; Presentation at the Astronomical Data Analysis 5th Conference (ADA5), May 7-9, 2008.

Bronstein, M., et al.; "Blind Deconvolution of Images using Optimal Sparse Representations"; IEEE Transactions on Image Processing; 14(6):726-736, 2005.

Bruckstein, A., et al.; "From Sparse Solutions of Systems of Equations to Sparse Modeling of Signals and Images"; SIAM Review, vol. 51, No. 1, pp. 34-81, Feb. 2009.

Bruckstein, A., et al.; "On the Uniqueness of Nonnegative Sparse Solutions to Underdetermined Systems of Equations"; IEEE Transactions on Information Theory; vol. 54, No. 11, pp. 4813-4820, Nov. 2008.

Bultan, A.; "A Four-Parameter Atomic Decomposition of Chirplets"; IEEE Trans. Signal Processing, vol. 47, pp. 731-745, Mar. 1999.

Charles, A., et al.; "Learning Sparse Codes for Hyperspectral Imagery"; Journal of Selected Topics in Signal Processing, 2011. In press.

Chen, M., et al.; "Image Fusion Based on Extensions of Independent Component Analysis"; International Society for Photogrammetry and Remote Sensing; Commission VII—Thematic Processing, Modeling and Analysis of Remotely Sensed Data (2008-2012) Working Group WG VII/6—Remote Sensing Data Fusion; http://www.isprs.org/proceedings/XXXVII/congress/7_pdf/6_WG-VII-6/10.pdf; Jun. 2008.

Davis, G., et al.; "Adaptive greedy approximations"; Constructive Approximation, vol. 13, No. 1, pp. 57-98, 1997.

Demir, B., et al.; "Empirical Mode Decomposition Preprocess for Higher Accuracy Hyperspectral Image Classification"; IEEE International Conference on Geosience and Remote Sensing Symposium, Boston, Massachusetts, USA, 2008, pp. II-939-II-941.

Donahue, M., et al.; "Sparse Representations for Image Decompositions with Occlusions"; IEEE Conference on Computer Vision and Pattern Recognition, vol. 1, 1996, pp. 7-12.

Ghaffari, A., et al.; "Sparse Decomposition of Two Dimensional Signals", IEEE International Conference on Acoustics, Speech, and Signal Processing, (ICASSP'09), pp. 3157-3160; Apr. 19-24, 2009.

González-Audícana, M., et al.; "Comparison between Mallat's and the 'à trous' discrete wavelet transform based algorithms for the fusion of multispectral and panchromatic images"; International Journal of Remote Sensing, vol. 26, No. 3, pp. 597-616; Feb. 2005.

Gribonval, R., et al.; "Atoms of all channels, unite! Algorithms for multichannel sparse representations"; http://www.cirm.univ-mrs.fr/videos/2007/exposes/25/Gribonval.pdf; Sep. 2007.

Gribonval, R., et al.; "Atoms of all channels, unite! Average case analysis of multi-channel sparse recovery using greedy algorithms"; Tech. Rep. IRISA No. 1848, IRISA, 2007.

Gribonval, R.; "Sparse decomposition of stereo signals with matching pursuit and application to blind separation of more than two sources from a stereo mixture"; Proc. Int. Conf. Acoust. Speech Signal Process (ICASSP 02), Orlando, May 2002.

Leviatan, D., et al.; "Simultaneous Approximation by Greedy Algorithms," Univ. South Carolina at Columbia, Dept. Math., Columbia, SC, IMI Rep. 2003:02, 2003.

Li, Y. et al.; "Underdetermined Blind Source Separation Based on Sparse Representation"; IEEE Transactions on Signal Processing, vol. 54, No. 2, pp. 423-437, Feb. 2006.

Mallat, S., et al.; "Matching Pursuits with Time-Frequency Dictionaries," IEEE Transactions on Signal Processing, 41 (1993)3397-3415.

Mohimani, H., et al.; "A fast approach for overcomplete sparse decomposition based on smoothed $\ell 0$ norm"; IEEE Transactions on Signal Processing, vol. 57, No. 1, pp. 289-301, Jan. 2009.

(56) References Cited

OTHER PUBLICATIONS

Nikolov, S., et al.; "Wavelets for image fusion"; Chapter 1 of Wavelets in Signal and Image Analysis, from Theory to Practice; A. Petrosian and F. Meyer, editors; Kluwer Academic Publishers, 2001..

Ramirez, I., et al.; "Classification and Clustering via Dictionary Learning with Structured Incoherence and Shared Features," in CVPR, Jun. 2010.

Rodriguez, F., et al.; "Sparse representations for image classification: Learning discriminative and reconstructive non-parametric dictionaries"; Technical report, University of Minnesota, IMA Preprint 2213, Jun. 2008.

Sadler, B., et al.; "Optimal and wavelet-based shock wave detection and estimation"; Acoustical Society of America Journal, 104:955-963, Aug. 1998.

Shippert P.; "Introduction to Hyperspectral Image Analysis," Online Journal of Space Communication; http://spacejournal.ohio.edu/pdf/shippert.pdf, 2003.

Sieracki, J., et al.; "Greedy adaptive discrimination: component analysis by simultaneous sparse approximation"; Proc. of SPIE, vol. 5914, pp. 59141R, 2005.

Smith, R.; "Introduction to Hyperspectral Imaging"; http://www.microimages.com/documentation/Tutorials/hyprspec.pdf; Jan. 2010.

Sprechmann, P., et al.; "Dictionary learning and sparse coding for unsupervised clustering"; IMA Preprint 2281, Sep. 2009.

Starck, J., et al.; "Very High Quality Image Restoration by Combining Wavelets and Curvelets," Proc. SPIE Conf. Signal and Image Processing:Wavelet Applications in Signal and Image Processing IX, vol. 4478, pp. 9-19, Aug. 2001.

Sugden, P., et al.; "Underdetermined noisy blind separation using dual matching pursuits," in Proc. ICASSP, 2004, pp. 557-560.

Tropp, J.; "Greed is good: Algorithmic Results for Sparse Approximation"; IEEE Transactions on Information Theory, vol. 50, No. 10, pp. 2231-2242, Oct. 2004.

Tropp, J., et al.; "Improved sparse approximation over quasi-incoherent dictionaries"; 2003 International Conference on Image Processing, ICIP 2003, Proceedings, vol. 1 pp. I-37-I-40; Sep. 14-17, 2003.

Tropp, J., et al.; "Algorithms for simultaneous sparse approximation. Part I: Greedy pursuit," Signal Processing, vol. 86, pp. 572-588, 2006.

Tropp, J.; "Algorithms for simultaneous sparse approximation. Part II: Convex relaxation," Signal Processing, vol. 86, pp. 589-602, 2006.

Valiollahzadeh, S., et al.; "Hyperspectral Data Reconstruction Combining Spatial and Spectral Sparsity"; Computational & Applied Mathematics, Rice University; Technical Reports; http://www.caam.rice.edu/~wy1/paperfiles/Rice_CAAM_TR10-29_Hyperspectral.PDF; Nov. 2010.

Yu, G., et al.; "Image modeling and enhancement via structured sparse model selection"; In ICIP, 2010.

Zelinski, A., et al.; "Denoising Hyperspectral Imagery and Recovering Junk Bands using Wavelets and Sparse Approximation," in IEEE Int. Geosci. Remote Sensing Symp. (IGARSS 2006), Denver, Aug. 2006, pp. 387-390.

* cited by examiner

|  | Actual |  |  |  |  |  |  |  |
|---|---|---|---|---|---|---|---|---|
| Classified | KC | PJ | AR | CO | BC | ED | MO | WG |
| KC | 5 | 0 | 0 | 0 | 0 | 0 | 0 | 0 |
| PJ | 0 | 5 | 0 | 0 | 0 | 0 | 0 | 0 |
| AR | 0 | 0 | 5 | 0 | 0 | 0 | 0 | 0 |
| CO | 0 | 0 | 0 | 5 | 0 | 0 | 0 | 0 |
| BC | 0 | 0 | 0 | 0 | 5 | 0 | 0 | 0 |
| ED | 0 | 0 | 0 | 0 | 0 | 5 | 0 | 0 |
| MO | 0 | 0 | 0 | 0 | 0 | 0 | 5 | 0 |
| WG | 0 | 0 | 0 | 0 | 0 | 0 | 0 | 5 |
| Null | 0 | 0 | 0 | 0 | 0 | 0 | 0 | 0 |

*5 files per speaker, 100% accuracy*

|  | Actual |  |  |  |  |  |  |  |
|---|---|---|---|---|---|---|---|---|
| Classified | KC | PJ | AR | CO | BC | ED | MO | WG |
| KC | 10 | 0 | 0 | 0 | 0 | 0 | 0 | 0 |
| PJ | 0 | 10 | 0 | 0 | 0 | 0 | 0 | 0 |
| AR | 0 | 0 | 9 | 0 | 0 | 0 | 0 | 0 |
| CO | 0 | 0 | 0 | 10 | 0 | 0 | 0 | 0 |
| BC | 0 | 0 | 0 | 0 | 10 | 0 | 0 | 0 |
| ED | 0 | 0 | 1 | 0 | 0 | 10 | 0 | 1 |
| MO | 0 | 0 | 0 | 0 | 0 | 0 | 10 | 0 |
| WG | 0 | 0 | 0 | 0 | 0 | 0 | 0 | 9 |
| Null | 0 | 0 | 0 | 0 | 0 | 0 | 0 | 0 |

*10 files per speaker, 97.5% accuracy*

Figure 3a

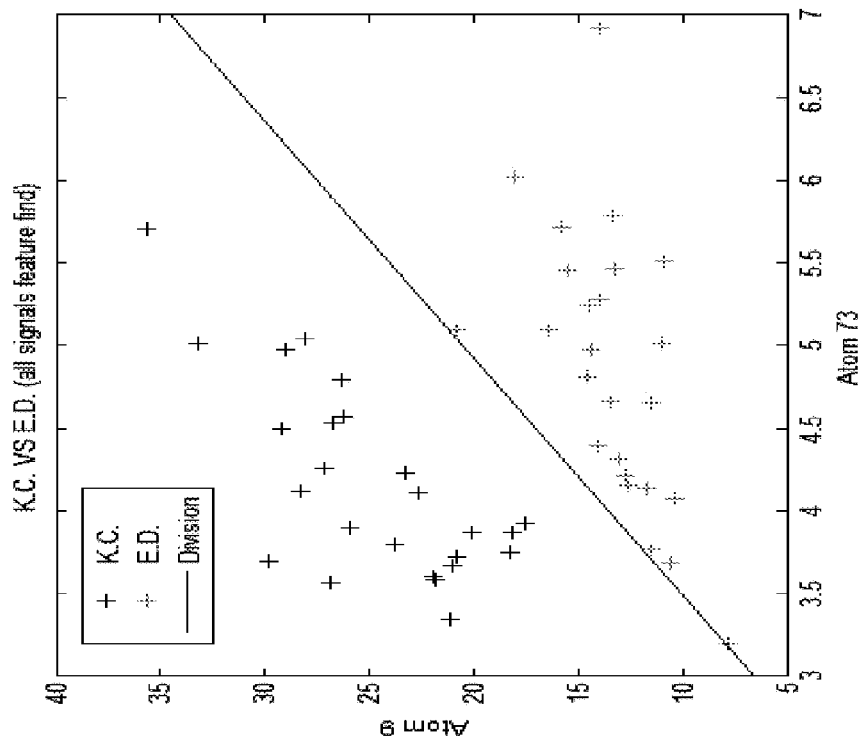
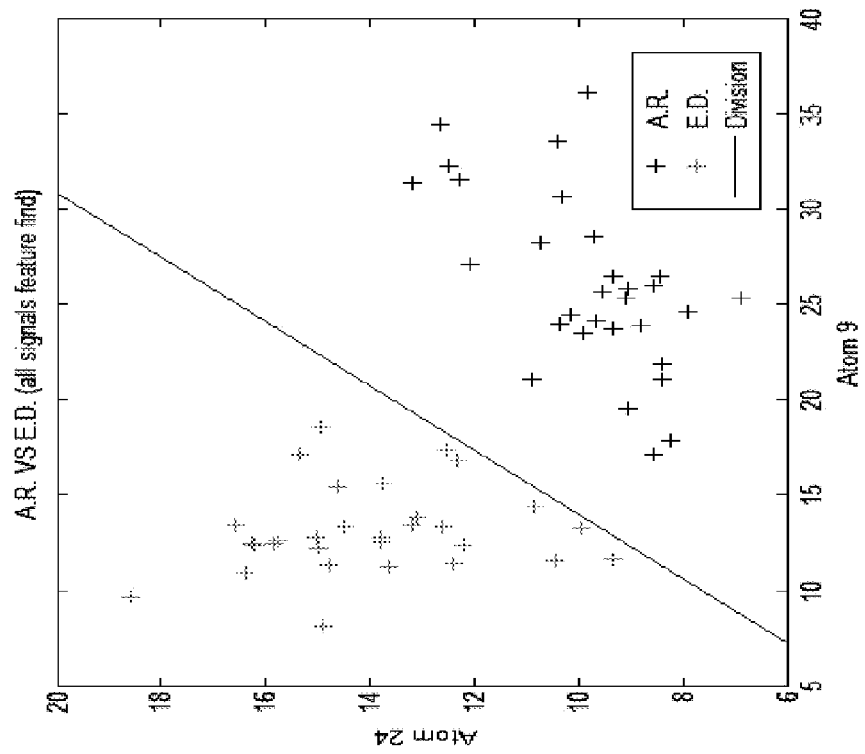
Figure 4a

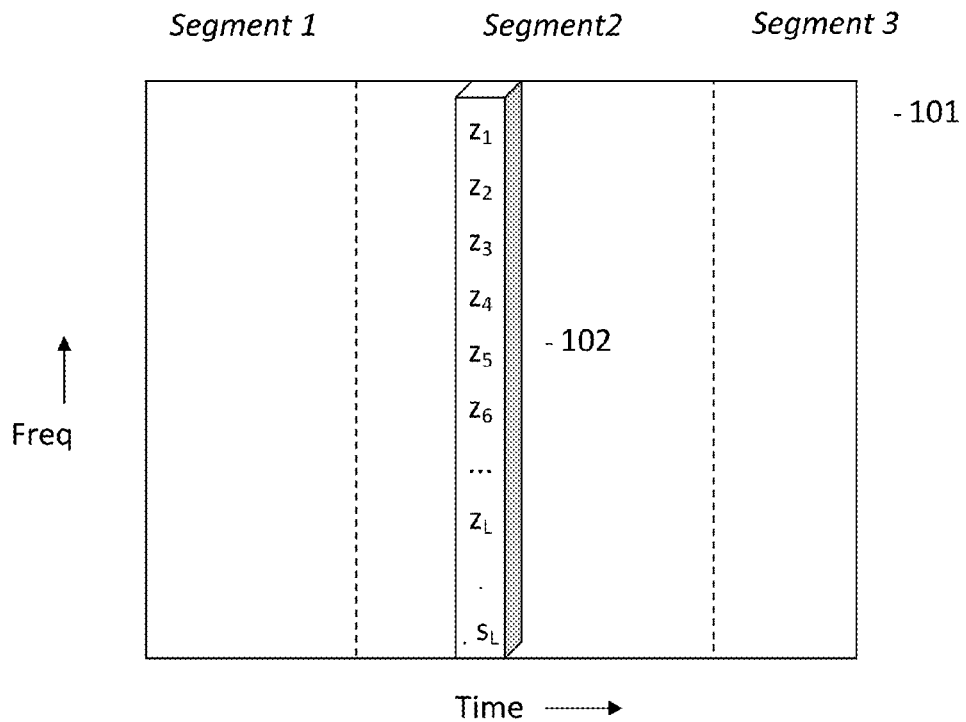
Segment 2, $i^{th}$ Sub-Segment Spectrum : $(z_1\, z_2\, z_3\, z_4\, z_5\, z_6 \ldots z_L)$   - 103
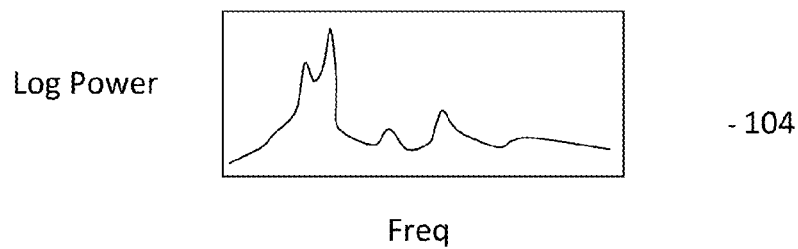
Figure 6

| 0 | 1\|\|2 | 1\|\|3 | 1\|\|4 | 1\|\|5 | 1\|\|6 | 1\|\|7 | 1\|\|8 |
|---|---|---|---|---|---|---|---|
| 0 | 0 | 2\|\|3 | 2\|\|4 | 2\|\|5 | 2\|\|6 | 2\|\|7 | 2\|\|8 |
| 0 | 0 | 0 | 3\|\|4 | 3\|\|5 | 3\|\|6 | 3\|\|7 | 3\|\|8 |
| 0 | 0 | 0 | 0 | 4\|\|5 | 4\|\|6 | 4\|\|7 | 4\|\|8 |
| 0 | 0 | 0 | 0 | 0 | 5\|\|6 | 5\|\|7 | 5\|\|8 |
| 0 | 0 | 0 | 0 | 0 | 0 | 6\|\|7 | 6\|\|8 |
| 0 | 0 | 0 | 0 | 0 | 0 | 0 | 7\|\|8 |
| 0 | 0 | 0 | 0 | 0 | 0 | 0 | 0 |

Table 1: Comparison Matrix Structure (8 groups). Each zero represents an actual zero in the comparison matrix. Each binary comparison is actually a 1 or a 2 depending on whether it is in the group to the left of the || (1) or if it is in the group to the right of the || (2). Each row corresponds to the groups on the left of the ||, and each column corresponds to the groups on the right.

| 0 | 1 | 1 | 2 | 1 | 1 | 1 | 1 |
|---|---|---|---|---|---|---|---|
| 0 | 0 | 2 | 1 | 2 | 2 | 1 | 2 |
| 0 | 0 | 0 | 1 | 2 | 1 | 2 | 2 |
| 0 | 0 | 0 | 0 | 2 | 1 | 1 | 2 |
| 0 | 0 | 0 | 0 | 0 | 1 | 1 | 2 |
| 0 | 0 | 0 | 0 | 0 | 0 | 2 | 1 |
| 0 | 0 | 0 | 0 | 0 | 0 | 0 | 2 |
| 0 | 0 | 0 | 0 | 0 | 0 | 0 | 0 |

Table 2: Sample Comparison Matrix (8 groups). This Comparison matrix would result in the following votes:
Group 1: 6 votes     Group 2: 2 votes
Group 3: 3 votes     Group 4: 3 votes
Group 5: 5 votes     Group 6: 2 votes
Group 7: 2 votes     Group 8: 5 votes

Figure 11

SYSTEM AND METHOD FOR DISTINGUISHING SOURCE FROM UNCONSTRAINED ACOUSTIC SIGNALS EMITTED THEREBY IN CONTEXT AGNOSTIC MANNER

RELATED APPLICATION DATA

This Application is based on Provisional Patent Application No. 61/504,221, filed 3 Jul. 2011.

BACKGROUND OF THE INVENTION

The present invention is directed to a system and method for processing signals for signature detection. More specifically, the system and method are directed to the processing of unconstrained acoustic signals such as audible speech and other sounds emitted by various sources. In certain embodiments and applications, the system and method provide for such processing in context-agnostic manner to distinguish the sources for identification and classification purposes. In certain speech applications, for instance, the subject system and method provide for the identification and classification of speech segments and/or speakers in context-agnostic manner.

Exemplary embodiments of the present invention utilize certain aspects of methods and systems previously disclosed in U.S. patent application Ser. No. 10/748,182, (now U.S. Pat. No. 7,079,986) entitled "Greedy Adaptive Signature Discrimination System and Method" referred to herein as reference [1], as well as certain aspects of methods and systems previously disclosed in U.S. patent application Ser. No. 11/387,034, entitled "System and Method For Acoustic Signature Extraction, Detection, Discrimination, and Localization" referred to herein as reference [2]. This techniques and measures disclosed by these references are collectively and generally referred to herein as [GAD].

Autonomous machine organization of collections of natural speech has proven to be a difficult problem to address. The challenge of selecting a robust feature space is complicated by variations in the words spoken, recording conditions, background noise, etc. Yet the human ear is remarkably adept at recognizing and clustering speakers. Human listeners effortlessly distinguish unknown voices in a recorded conversation and can generally decide if two speech segments come from the same speaker with only a few seconds of exposure. Human listeners can often make this distinction even in cases where they are not natively familiar with the speaker's language or accent.

Both voice recognition and voice-print biometric technologies are comparatively well developed. Hence, many researchers have addressed the problem of sorting natural speech by applying voice recognition to capture key phonemes or words, then attempting to establish a signature for each speaker's pronunciation of these key words. This is a natural approach to engineering a system from component parts; however, it is limited by language, accents, speaking conditions, and probability of hitting key signature words.

Attempts at using these and other technologies to even approach, much less exceed, the human ear's capability to distinguish different speakers from their speech samples alone have proven to be woefully lacking. This is especially so, where the speech samples are unconstrained by any cooperative restrictions, and the speaker is to be distinguished without regard to the language or other substantive content of the speech. There is therefore a need to provide a system and method for use in speech and other applications, whereby the source of unconstrained acoustic signals may be accurately distinguished from those signals in context-agnostic manner.

SUMMARY OF THE INVENTION

It is an object of the present invention to provide a system and method for automatically and accurately distinguishing sources of acoustic signals one from the other.

It is another object of the present invention to provide a system and method for automatically and accurately discriminating sources of acoustic signals in context-agnostic manner.

It is yet another object of the present invention to provide a system and method for automatically and accurately identifying and classifying sources of unconstrained acoustic signals in context-agnostic manner.

These and other objects are attained by a system formed in accordance with certain embodiments of the present invention for distinguishing between a plurality of sources based upon unconstrained acoustic signals captured therefrom. The system comprises a transformation unit applying a spectrographic transformation upon each time-captured segment of acoustic signal received thereby. The transformation unit generates a spectral vector for each segment. A sparse decomposition unit is coupled to the transformation unit. The sparse decomposition unit selectively executes in at least a training system mode a simultaneous sparse approximation upon a joint corpus of spectral vectors for a plurality of acoustic signal segments from distinct sources. The sparse decomposition unit generates at least one sparse decomposition for each spectral vector in terms of a representative set of decomposition atoms. A discriminant reduction unit is coupled to the sparse decomposition unit, and is executable during the training system mode to down-select from the representative set of decomposition atoms an optimal combination of atoms for cooperatively distinguishing acoustic signals emitted by different ones of the distinct sources. A classification unit is coupled to the sparse decomposition unit, the classification unit being executable in a classification system mode to discover for the sparse decomposition of an input acoustic signal segment a degree of correlation relative to each of the distinct sources.

A method formed in accordance with certain embodiments of the present invention provides for distinguishing between a plurality of sources based upon unconstrained acoustic signals captured therefrom. The method comprises applying a spectrographic transformation upon a plurality of time-captured segments of acoustic signals to generate a spectral vector for each segment. The method also comprises selectively executing in a processor a sparse decomposition of each spectral vector. The sparse decomposition includes executing in a training system mode a simultaneous sparse approximation upon a joint corpus of spectral vectors for a plurality of acoustic signal segments from distinct sources. At least one sparse decomposition is executed for each spectral vector in terms of a representative set of decomposition atoms. Discriminant reduction is executed in a processor during the training system mode to down-select from the representative set of decomposition atoms an optimal combination of atoms for cooperatively distinguishing acoustic signals emitted by different ones of the distinct sources. Classification is executed upon the sparse decomposition of an input acoustic signal segment unit during a classification system mode. The classification includes executing a processor to discover a degree of correlation for the input acoustic signal segment relative to each of the distinct sources.

A system formed in accordance with certain other embodiments of the present invention provides for distinguishing a source from unconstrained acoustic signals captured thereby in context agnostic manner. The system comprises a transformation unit, a training unit, and a classification unit. The transformation unit applies a Short-Time-Fourier-Transform (STFT) process upon each time-captured segment of acoustic signal received thereby. The transformation unit generates a spectral vector defined in a time-frequency plane for each segment. The training unit is coupled to the transformation unit, and includes a cepstral decomposition portion and a discriminant reduction portion. The cepstral decomposition portion executes a simultaneous sparse approximation upon a joint corpus of spectral vectors for a plurality of acoustic signal segments from distinct sources. The simultaneous sparse approximation includes a greedy adaptive decomposition (GAD) process referencing a Gabor dictionary. The cepstral decomposition portion generates for each spectral vector in the joint corpus at least one cepstral decomposition defined on a cepstral-frequency plane as a coefficient weighted sum of a representative set of decomposition atoms. The discriminant reduction portion is coupled to the cepstral decomposition portion, and is executable to down-select from the representative set of decomposition atoms an optimal combination of atoms for cooperatively distinguishing acoustic signals emitted by different ones of the distinct sources. The classification unit is coupled to the transformation unit, and includes a cepstral projection portion and a classification decision portion. The cepstral projection portion projects a spectral vector of an input acoustic signal segment onto the cepstral-frequency plane to generate a cepstral decomposition therefor as a coefficient weighted sum of the representative set of decomposition atoms. The classification decision portion is coupled to the cepstral projection portion, and is executable to discover for the cepstral decomposition of the input acoustic signal segment a degree of correlation relative to each of the distinct sources.

BRIEF DESCRIPTION OF THE DRAWINGS

FIG. 3a is a set of comparative confusion matrices of certain test results obtained for illustrative purposes utilizing a system formed in accordance with the exemplary embodiment illustrated in FIGS. 1 and 2;

FIG. 4a is a set of illustrative graphic SVM plots of certain test results obtained for distinguishing between sources of speech segments utilizing a system formed in accordance with the exemplary embodiment illustrated in FIGS. 1 and 2;

FIG. 6 is a set of schematic diagrams illustratively representing a segment of acoustic data and an example of a log power spectrum corresponding to a segment of acoustic data;

FIG. 11 is a set of comparison matrices of certain test results obtained utilizing a system formed in accordance with the exemplary embodiment illustrated in FIGS. 1 and 2, showing the distribution of classification votes relative to known sources; and, FIG. 12 is a flow diagram illustrating a voting process for correspondingly mapping an input acoustic signal segment to pair-wise decision subspace in accordance with an exemplary embodiment of the present invention.

DETAILED DESCRIPTION OF THE PREFERRED EMBODIMENTS

Figure 1:
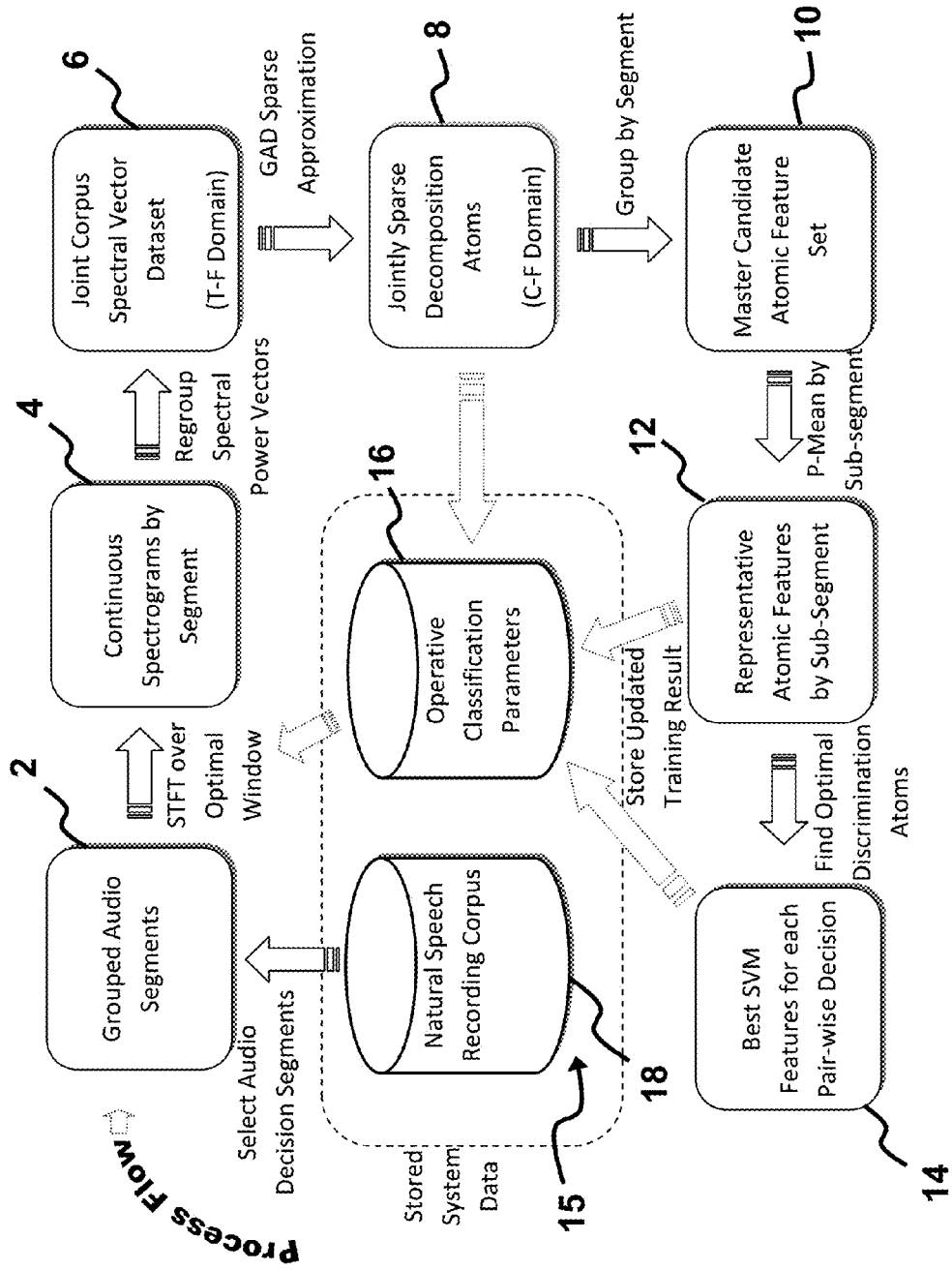
FIG. 1 is a flow diagram schematically illustrating the flow of processes for training a system to distinguish sources of acoustic signals in accordance with an exemplary embodiment of the present invention.

Briefly, the subject system and method serve to distinguish the source from the unconstrained acoustic signals they emit, and do so in context-agnostic manner. That is, the system and method identify and classify sources of such acoustic signals as audible speech and various other sounds. In certain embodiments and applications, the system and method provide for identification and classification of sources even if the acoustic signals they emit are not subject to any requisite form, pattern, or other constraint. This is without regard to any context-specific information delivered by or through the acoustic signals such as data content, semantic content, embodying language, digital encoding, or the like.

That is not to say that certain shared attributes of a group other than simple voice features, for instance, in verbal speech applications cannot be used for source classification purposes. In fact the distinct sources distinguished by the subject system and method may be classified in any suitable manner required by the particularities of the intended application. For example, in addition to classification by individual speaking voice(s), the distinguished sources may comprise groups of speakers having such shared attributes as common spoken language, common gender, common ethnicity, common idiosyncrasies, common verbal tendencies, common exhibited stress level, and the like may be collectively classified as such. Even such context-specific attributes may be discriminated by the context-agnostic processing of acoustic signal segments carried out by certain embodiments of the subject system and method.

The subject system and method may be embodied for use in numerous applications where one or more sources of unconstrained, even spurious, acoustic signals are to be accurately distinguished. For example, the subject system and method may be implemented in applications such as: identification and classification of speakers without the speakers' cooperation or regard for the language(s) spoken; identification and classification of various animal sounds; identification and classification of various mechanical/machinery sounds; and identification and classification of various other natural or manmade phenomena by the acoustic signals generated by their occurrence.

Depending on the particular requirements of the intended application, a given source may be distinguished by uniquely identifying it, or by classifying it in application-specific manner. In the exemplary embodiments disclosed for speech applications, for instance, the classification preferably entails applications such as:

(1) categorizing new signals as belonging to one or more groups of already known speakers;
(2) filtering or sequestering new signals as anomalous and not matching any known speakers;
(3) automatically clustering a large set of signals from unknown speakers into sorted groups (by speaker, gender, etc.); and,
(4) automatically segmenting or discriminating portions of one signal (such as captured from a telephone conversation or recorded interview involving multiple speakers) and sorting the resulting segments to accordingly discriminate the speaking parties one from the other.

Preferably in each of these speech applications, the system and method provide the identification and classification of speakers is based on their unconstrained, even spurious, speech segments. The speakers need not be cooperative, let alone even aware of the identification and classification process carried out on their speech. Moreover, the process is preferably context-agnostic in the sense that it operates effectively irrespective of the language spoken (or not spoken) by the speaker.

In certain exemplary embodiments, optimal feature sets are determined for discrimination and comparison between segments of natural speech. Depending on subsequent processing carried out in light of the optimal feature sets, the degree of similarity or newness of a speech segment's unknown source relative to previously indexed sets of speakers may be ascertained. In the absence of prior indexing of known speakers, un-indexed speaker data may be acquired and automatically clustered to form distinct speaker groups. In some applications, transmitted conversations between multiple speakers may be monitored, so that targeted speakers of interest, famous personalities, and the like may be automatically identified. The applications may be extended for such uses as automatically indexing web speaker data, and suitably indexing recorded meetings, debates, and broadcasts.

Once enough speech segments have been acquired and processed, certain extracted feature information may be used to conduct various searches for matching speakers from the unconstrained speech segments in a database query-like fashion. The extracted information may also be used to find similar speech to a given speech sample from an unknown speaker. Similarly, extracted information may also be used to identify the particular language being spoken in the given speech sample.

In certain exemplary embodiments, a sparse-decomposition approach is applied in the processing to identify and classify the speaker(s). Preferably, the acoustic signal is first subjected to a transform, such as a Fourier transform. The sparse decomposition is then applied to the spectrogram resulting from Fourier transform.

For optimal results, sparse decomposition is preferably applied in the form of GAD. Rather than applying GAD to original time domain signals for sparse decomposition is in the time-frequency plane, GAD is applied to the spectrogram generated by Fourier transforming the original signal then taking a log power spectrum. Thus, GAD sparse decomposition is applied to generate a second order spectrum, represented in a "cepstrum-frequency" plane. Various vectors resulting from this "cepstral" decomposition are used with suitable machine learning methods to distinguish different speakers from one another in highly accurate manner, irrespective of what language(s) they may be speaking.

In an exemplary embodiment of the present invention, one or more sparse and simultaneous sparse approximation techniques are applied to the spectrogram data to extract one or more ideal feature sets for undertaking the target discriminations and comparisons. The extracted features are treated and processed accordingly to further reduce the selection set and achieve high-reliability comparisons on natural speech using suitable non-parametric Support Vector Machine (SVM) methods.

Enabling practical searches and automated analyses over large sets of natural speech recordings requires means to separate tagged segments as well as to cluster and associate untagged segments. Component challenges include:

(1) Optimizing a vocal feature set to minimize the size of the vector space for fast processing while maintaining high inter-speaker discrimination rates.
(2) Avoiding reliance on word or phoneme sets so that any available natural speech segments may be handled, and the system may remain independent of language, dialect, or any other speech content.
(3) Operating on speaker recordings that may vary widely in equalization and quality.
(4) Demonstrating robust, unsupervised machine segmentation or severalization of large sets of untagged sound recordings.

In accordance with certain illustrative embodiments of the subject system a method, the commonly used (mel)cepstrum class fixed feature spaces are replaced with an adaptive, sparse-tiling of the cepstrum-frequency (C-F) plane which is obtained using the above-referenced Greedy Adaptive Discrimination (GAD) tools. GAD inherently compensates for signal-to-signal variation in several dimensions, collapsing loosely coherent sample groups into tight joint approximations. This concentrates similarity and difference information in a low-dimensional vector space, which is then rapidly segmented using any suitable non-parametric Support Vector Machine (SVM) approach. By avoiding direct vector space similarity metrics, problems associated with reliance upon distribution estimates of the component and abstract feature quantities are avoided. Processing is also radically accelerated. Preferably, a system formed in accordance with the disclosed embodiment operates on unconstrained, natural speech, without reliance on specific word or phoneme detection, and is substantially language and dialect agnostic.

Test results have demonstrated some 98.75% classification accuracy on an exemplary test database comprising 80 unconstrained internet speech files: sorting 8 speakers, and 10 independent recordings of each. Test results have yielded excellent receiver operator characteristic (ROC) curves for distinguishing between unknown and familiar speakers in newly obtained speech segments. Test results have demonstrated functional auto-clustering of a dataset using a non-parametric approach. They've demonstrated the adaptive C-F feature space disclosed herein to be extremely successful in providing a sparse set of discriminatory elements, as the approach generates very low-dimensional vector subspaces. High-accuracy decisions in the test set were found to typically require only 2 degrees of freedom. The resulting low-dimensional computations and avoidance of explicit distance metrics have led to extremely fast processing in clustering and similarity queries.

Turning more specifically to speech applications, the signature structure of a human voice has long been recognized to stem from the combination of fundamental vocal fold frequencies and resonances of the remaining vocal tract (e.g. formants). These measurable spectral peaks not only play a key and obvious role in the voicing of vowels, but also exhibit speaker-specific dynamics as vowels transition through plosive and fricative phonemes. The center frequency of a voice changes with inflection and other ordinary vocal dynamics.

From a signal processing perspective, viewing the vocal tract as a transfer function or a series of convolving filters yields useful models. In particular, voice recognition may be considered a problem of estimating the state of the vocal tract, given a certain speech signal. The cepstrum which mathematically results from taking a Fourier transform of the frequency log power spectrum, has historically proved a great aid in tackling this de-convolution problem, and variations on so called cepstral coefficients are employed in speech processing schemes. Because cepstrum analysis is linked to the shape and dynamics of the vocal tract, it may serve as a starting point for deriving a feature space that helps measure an individual's inherent characteristic acoustic tone.

Overlaid on the physical vocal tract structure of any given speaker is a second set of characteristic features which are entirely learned. These comprise the language, accent, and speaking idiosyncrasies that together establish typical, repeated patterns through which an individual moves the vocal tract to form phonemes and words. It also includes non-vocal utterances that speakers use as sentence starters or gap fillers (e.g. "um," "uh," etc.), as well as exclamations, laughter patterns, etc. This potential feature set also includes such personal tendencies as inflection and intonation habits.

Generally, the GAD processing architecture discovers signature structure in collections of weakly correlated data and subsequently enables signature detection in complex, noisy, and heterogeneous signal sets. Two fundamental aspects of GAD are that it operates to find joint information about a group of signals and that it collapses the joint information into a relatively small set of significant coefficients that is low-dimensional (i.e. "sparse") in comparison to the vector space of the original datasets.

In application to the problem of distinguishing a speaker (identifying, classifying), GAD is herein combined with certain other processing features to obtain a parametric representation of the data that sparsely tiles the cepstral-frequency (C-F) plane. For example, one embodiment uses suitably customized Support Vector Machine (SVM) type software to down-select and optimize candidate features into definitive signature sets for separating and clustering corresponding voice samples. Structure is added to collected speech segments, and a decision tree is generated for both sorting large speech databases and classifying novel speech segments against previous data.

In this regard, known parametric statistical clustering measures such as Radial Basis Functions and various Kohonen class metrics and learning methods are found to be deficient. Experience and experimentation show that they do not perform well in this feature space. The preferred abstract feature space forms a mathematical frame (a non-orthogonal spanning set with basis-like properties) that is not amenable to re-normalization in a way that is consistent with typical joint statistical distribution assumptions across arbitrary feature subspaces. The exemplary embodiments disclosed preferably employ non-parametric decision trees using subspaces by SVM, yielding excellent results.

This non-parametric approach is not exclusive. Alternate embodiments may be based on anomaly detection work, in which time-dynamics are captured using, for instance, a hidden Markov model. The subject sparse C-F feature space can be applied with metrics as listed in the preceding paragraph. While this approach could be used to address some of the speaker signature characteristics discussed further below, it would also add a layer of assumptions and processing which the preferred exemplary embodiment detailed herein avoids. The preferred exemplary embodiment generally seeks to maximize the actionable information return from each processing step, with the understanding that additional layers may be later added as necessary to refine the system. Results show that the disclosed system has succeeded in capturing speaker signature characteristics and sorting speakers without applying any additional layer yet.

The preferred exemplary embodiment also obviates the use of speech recognition technology such as the parsing of words or phonemes. Based on past studies of speech and human analyst capabilities, use of this technology has not proven effective enough to be essential for accurate speaker identification. Moreover, avoiding phonemic or word-based clustering not only simplifies the processing path, it ensures the system will be language and dialect agnostic.

The exemplary embodiment preferably operates by sub-segmenting short, natural speech samples to produce a cluster of feature vectors for each sample. Typical natural speech samples used in the disclosed system are preferably though not necessarily, 10-15 seconds, while feature vectors are generated with a sub-segment size of preferably though not necessarily, 1-3 seconds. Operating on audio files that contain multiple speakers (such as recorded conversations) proves relatively straightforward using these short segment sizes.

A notable additional advantage of the disclosed system is that it targets natural speech. As such, the system tends to be immune to changes in recording conditions. When test databases are derived from readily available sources—for example, online sites/sources such YOUTUBE—or otherwise derived from any amalgamated set of recordings collected by any suitable means and under various circumstances without unified production management, there is no control over recording quality, environment, or word choices. Preliminary results show a system implemented in accordance with the exemplary embodiment successfully processing such test database files, with the files requiring only minimal, fully automated preprocessing.

It should also be noted that while the disclosed embodiments have been described in the context of natural speech processing, certain alternate embodiments may be configured to accommodate automatic processing of natural utterances by animals such as birds, frogs, etc. This additional application enables, for example, the tracking and identification of either sounds made by certain species or sounds made by individual animals in a natural, unconstrained acoustic setting.

Certain other alternate embodiments may be configured to accommodate automatic processing of sounds characteristically generated by any other source. The context agnostic and signal-unconstrained nature of the disclosed system and method make them readily applicable for use with virtually any type of acoustic signal.

It will be clear to one versed in the signal processing art that methods such as this applicable to acoustic signals may, in other embodiments, be applied to signals in other modalities. For example, as a given system is not dependent upon data or any other context-defined information borne by the processed signals, it may be applied to process vibration or seismic signals; to radio frequency (RF) and other electromagnetic or optical signals; to time; space; or other indexed varying patterns in any physical medium or virtual computer data, and so forth. Preferably, the methods disclosed here in operate on context-agnostic signal recordings, enabling for example opportunistic passive RF monitoring, light monitoring, vibration monitoring, network data timing, etc., to be addressed. However, in other applications an active or interrogated signal return such as, for example, Radar, Sonar, ultrasound, or seismic soundings may be addressed in substantially similar manner.

Full Corpus Processing

Turning now to FIG. 1, there is shown a flow diagram providing an illustrative overview of a training process carried out in accordance with one exemplary embodiment of the present invention, as applied for instance towards distinguishing a human speaker(s) from their unconstrained speech. This system full-corpus update training process example starts by taking a selection of audio segments from a corpus and ends by updating the classification decision parameters with optimized class separation settings.

The process enables the given system to essentially learn how to best discriminate between speakers, or between groups of speakers. Toward that end, the exemplary embodiment obtains signature feature sets and operative classification and clustering parameters 16 for a given corpus of natural speech recordings 18, and maintains them in system data storage 15. This process of acquiring and updating data is run periodically to re-optimize the feature space based on all available data, and the stored parameters are then used for making on-the-fly determinations for classifying new speech segments or satisfying user queries.

From the natural speech corpus, audio decision segments are selected, which comprise short samples of continuous natural speech (e.g. 10-15 seconds) from a speaker. The selected segments are grouped at block 2. Depending on the particular requirements of the intended application, the decision scope may be defined according to entire files or according to individually captured segments from a file. This permits the grouping of presorted samples of single individuals, or the grouping of individual speakers in a multi-person conversation. A priori groups may be minimal and formed, for example, by simply grouping only the continuous speech samples from one speaker; or, they may be extensive and formed, for example, by leveraging previous sorting information to establish large known sample sets from the same speaker (or speakers).

From each continuous segment, a spectrogram is generated at block 4, by applying an optimally sized window for a short-time-Fourier-transform (STFT) process. Continuous spectrograms are formed by segment. As is known in signal processing art, the shape and size of the data window, the length of the FFT, and various interval averaging parameters provide a means for trading off smoothness against noisy detail in the spectral vectors. This affects subsequent steps, and in the course of processing such parameters may be suitably adjusted to better optimize the divisibility of the data, if necessary. Thereafter, the resulting power-spectral vectors are recombined to form a superset of samples at block 6. As indicated, the data at block 6 is defined in the time-frequency (T-F) plane; hence spectral dynamic information is captured from the collected natural speech samples.

The flow then proceeds to block 8, where a GAD type simultaneous sparse approximation operation (as described in following paragraphs) is carried out on the spectral vector dataset collected at block 6 to achieve a jointly sparse decomposition thereof. The decomposition provides for the spectral vectors of the dataset respective representations—each representation being a combination of a shared set of atoms weighted by corresponding coefficients (each atom itself being a multi-dimensional function of predefined parametric elements)—drawn from a Gabor or other suitable dictionary of prototype atoms. This provides a set of decomposition atoms, thereby creating a data-adaptive, sparse tiling of the cepstrum-frequency (C-F) plane that has been optimized to capture the common and discriminating characteristics of the dataset.

The decomposition atoms generated at block 8 are grouped by segment to form a master set of candidate atomic features at block 10. The master feature set provides the common atoms by which every spectral vector may be represented as a weighted combination of. The coefficients which provide the respective weighting provide a vector space of tractably small dimension.

The GAD operation retains sufficient information to map the decomposition back to the source space—in this case the T-F plane. While individual features lie in the C-F plane, the data remains indexed both by speech segment and by time-slice; thus, each speech segment may be viewed theoretically as density along a curve in the time-frequency-cepstrum space. This information is collapsed over sub-segments of time in each speech segment, capturing for example between 3 and 30 feature vectors (defined in cepstrum-frequency space for each sub-segment of time) per segment. That is, each speech segment is subdivided for purposes of processing into constituent (preferably overlapped) pieces of certain regulated length in time. Preferably, this is done using a weighted parametric mean (P-mean) operation that is part of the GAD architecture, as further described in following paragraphs. The parametric mean captures the atomic features' typicality over the given sub-segment of time, and stores the same as that sub-segment's representative vectors of atomic features.

At block 12, a collection of these representative vectors (corresponding to the different sub-segments) are thus generated in the C-F candidate feature space for each speech segment. Each speech segment may represent for example one specimen for one particular speaker for whom a plurality (number of sub-segments) of representative feature vectors are available. At this point, a smaller set of atoms optimally effective in discriminating one segment from another is sought.

A suitable SVM classification training system is preferably employed in this regard to down-select for each pair of speech segment classes a small sub-space of atoms that best discriminates between that particular pair of segment classes, as indicated at block 14. In the exemplary embodiment shown, the best (or optimal) pair of atoms for discriminating between the representative vectors two different speech segments is identified by SVM. The optimal sub-space of such pair-wise decision atoms for discriminating between the pair speech segments (speakers or classes of speakers) thus derived are added to the operative classification parameters 16 of the system data storage 15.

Experimental results demonstrate that a collection of such pair-wise decisions provides an effective and manageable basis for partitioning the data, and tends to be faster than building a multi-class partitioning space. After processing, the actual data stored in the system data storage 15 in this exemplary system includes the corpus of speech samples along with the operative classification parameters needed to speed processing of new files or user queries.

Preferably though not necessarily, a comparison of atoms from different vectors or decomposed representations as herein disclosed entail comparison of the atoms' respective coefficients. Depending on the particular requirements of the given application, and depending on the content of the atoms in question, a comparison of atoms may otherwise entail the comparison of other constituent values—such as modulation component, phase value, or the like—specific to those particular atoms.

The disclosed process may be suitably implemented on various types of acoustic signal segments other than the human speech example illustrated. Because the classification and discrimination of acoustic segments in the disclosed processing flow rely upon the signal qualities of the given segments (such as their spectral and cepstral features) rather than any contextually-determined information content of those segments, the process may be applied to those other acoustic signal segment types with little if any modification to the overall processing flow.

Incremental Update Processing

Figure 2:
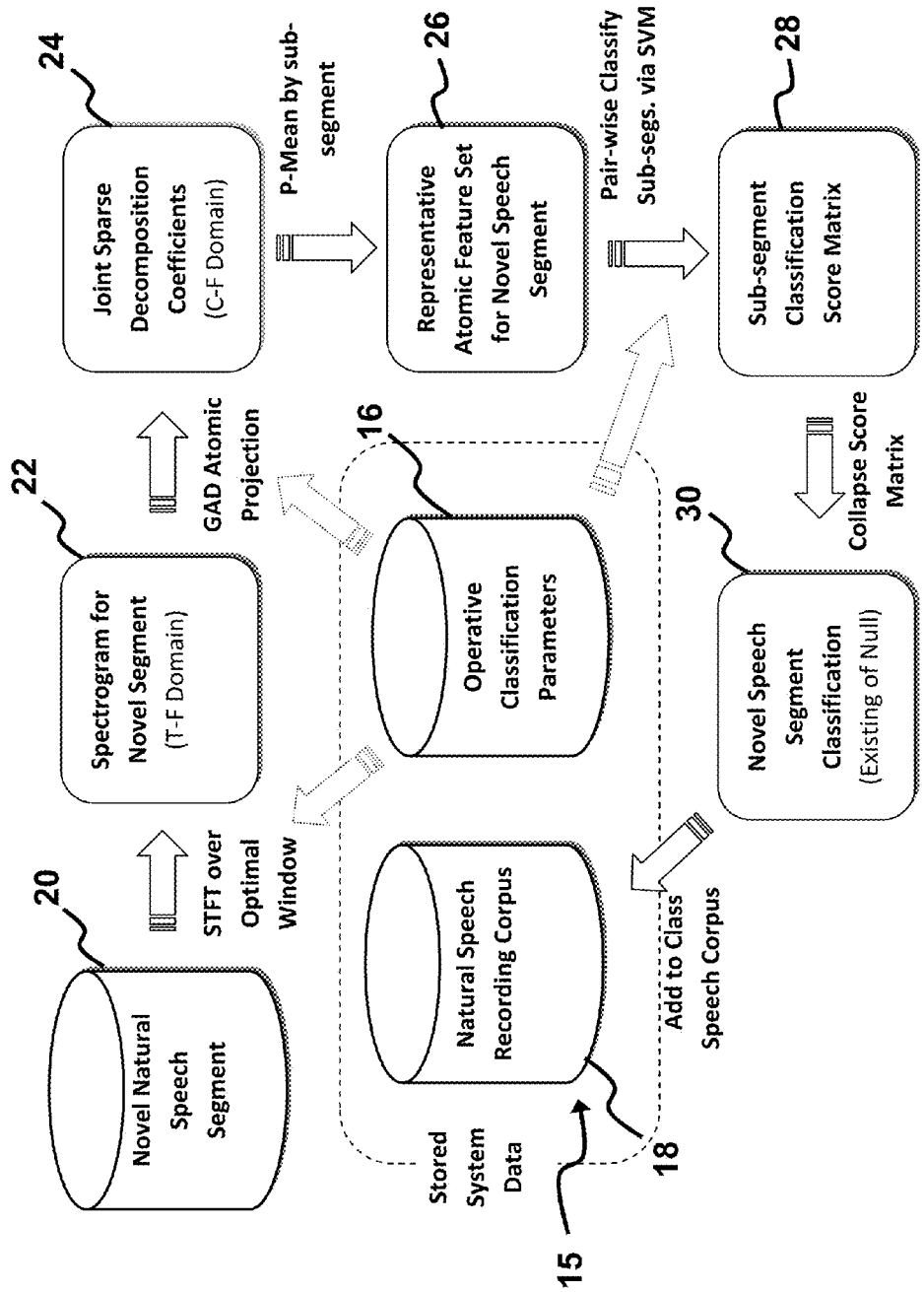
FIG. 2 is a flow diagram schematically illustrating the flow of processes for classifying an acoustic signal received by a system trained such as illustrated in FIG. 1, in accordance with an exemplary embodiment of the present invention.

Turning to FIG. 2, there is shown a flow diagram providing an illustrative overview of an iterative classification process carried out on newly acquired, or novel, speech signals in accordance with one exemplary embodiment of the present invention. Iterative classification of novel signals are made by this process using stored system data. As in the process of FIG. 1, a novel speech segment may be STFT transformed to form a spectrogram at block 22, then subjected to GAD atomic projection jointly with the group of spectrograms for previously acquired speech signal segments to form the joint sparse decomposition coefficients at block 24. In a similar but much faster process, the flow may proceed from block 20 bypassing blocks 22 and 24, whereby the novel speech segment is transformed and re-projected onto the coefficient set already obtained, such as at block 10 of FIG. 1. The novel speech segment is then re-defined in terms of those features already found in the master feature set, or alternatively, even in terms of the optimized feature space for distinguishing between different paired ones of segments pre-stored in system data storage.

In any event, the C-F domain speech segment is subdivided into constituent (preferably overlapped) pieces of certain regulated length in time, preferably using a weighted P-mean operation for the resulting sub-segments, to form representative vectors of atomic features at block 26. A classification process on the representative vectors makes use of the information obtained by the training process of FIG. 1, providing quick and accurate classification of the novel signal segments relative to the already acquired signal segments, without having to re-index the entire database sample corpus. SVM may then be used to classify this speech signal relative to other signal segments in the corpus, forming a score matrix for each time-sliced sub-segment of the speech signal segment at block 28.

Depending on the scoring process results, a novel signal may be assigned either to an existing class or to the null space at block 30. Signals assigned to the null space are deemed sufficiently different from all others in the corpus to warrant their own class, as they do not sufficiently match any existing samples. For example, the novel speech signal may be from a speaker whose samples have not been indexed before. As illustrated below by example, the size of the null space may be adjusted parametrically, so as to vary the tendency to extend/expand an existing class versus forming a new class.

Database Searches

A very similar process to that shown in FIG. 2 may be applied as a database search operation. By providing an example speech segment, its similarity to each and every other signal in the database may be quickly deduced. In those cases where the database is indexed into speaker classes, the class that best matches the example may be retrieved. In other cases where the database is un-indexed the closest N matches to the sample signal, for example, may be provided. If the sample signal is part of the existing corpus, processing is highly efficient since the key signature and SVM parameters would have already been extracted and stored.

Test Examples

Test Data

The internet provides a convenient source of suitably tagged but unstructured material. Organization and search of online voice audio also provides an important potential market for a system implemented in accordance with the exemplary embodiment disclosed. The test corpus for the following examples was acquired from readily available online sources. It comprises clips of 8 public figures balanced over gender. Alphabetically the sources varied in gender, age, voice, and speaking style are identified (BC), (KC), (ED), (WG), (PJ), (MO), (CO), and (AR). A primary set of 10 sample files was used from each speaker, providing a total of 80 independent natural speech files in the corpus.

Minimal Pre-Processing

From each file, segments of between 10 and 30 seconds were extracted at random. These were down sampled to a 11025 Hz sample rate, but otherwise unmodified. As background sounds such as coughs, microphone bumps, irregular music, or audience laugher could degrade performance, and in certain embodiments of the system suitable filters may be selectively employed for these areas of speech to mitigate their degrading effects. These are based on multi-band RMS energy detection. Alternatively, GAD techniques may be used to create better, adaptive matched filters.

The data shown was not pre-filtered, although previewed to control extreme artifact and to ensure that each sample represented mostly the target speaker. Five of the files were determined to be relatively clear of background clutter, while an additional five files exhibited increasing levels of noise—in particular, speech over applause or music. No specific effort was made to control for variations in audio quality.

Certain other embodiments may employ active measures to identify speech areas of the recording. This includes applying a band-limited envelope trigger to identify the start points of individual utterances, and indexing the start of each working audio segment to a time point offset by fixed amount from the trigger index points.

Successful Feature Space Partitioning of Speech Samples

In order to confirm the effectiveness of the subject feature space and classification scheme on this dataset, a leave-one-out type analysis was performed. Leaving each speech file in the corpus one at a time, the system was trained on the remaining data and classification of the excluded file as a novel signal was subsequently attempted. Using only the five cleanest speech segment files per speaker, perfect 100% results were obtained. Adding five additional noisier speech segment files per speaker, a 97.5% accuracy rate was obtained.

The chart in FIG. 3a shows the resulting confusion matrices (in this example, for eight speakers, five files each in the first matrix and eight speakers, ten files each in the second matrix). In the first chart using the five cleanest files, all five files for every actual speaker are shown properly classified to them. In the second chart with ten total files for every actual speaker, all ten files are shown properly correlated for six of the eight actual speakers. Nine of the ten files are shown properly correlated to the remaining two actual speakers.

For this example, the decision segments from each file included only 10 seconds of speech. Each of the decision segments was represented by three 3-second span feature vectors. The misclassified speech segment for WG was determined to include loud background applause, while the misclassified speech segment for AR was determined to have suffered from irregular microphone equalization.

Figure 3B:
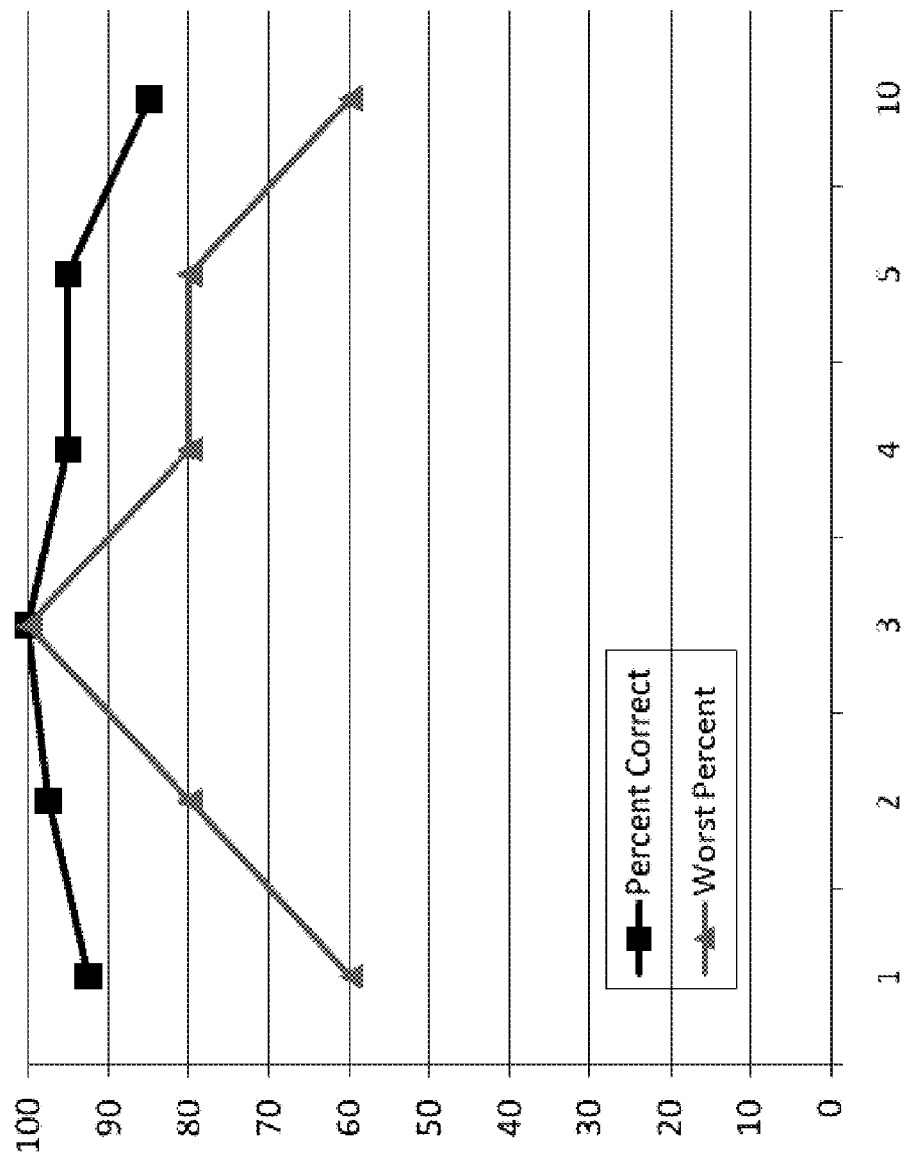
FIG. 3b is a set of comparative graphic plots of certain test results illustratively demonstrating an optimal sub-segment length parameter employed in a system formed in accordance with the exemplary embodiment illustrated in FIGS. 1 and 2.

The partitioning of each speech segment into sub-segments involves a tradeoff between providing more feature vectors for each speech segment and maintaining large enough sub-segments to capture characteristic signature aspects of a speaker's vocalization. FIG. 3b shows graphic plots of both total classification accuracy and worst case accuracy (in percentage) vs. sub-segment time size (in seconds). As judged by both total accuracy and worst case accuracy for individual speakers, the resulting plots reveal for this dataset that a sub-segment size of approximately 3 seconds gives optimal classification performance for each feature vector. In fact, increasing the segmentation to include 3 second segments that overlap by ½ second (i.e., 13 feature vectors per segment) led to elimination of the WG misclassification shown in the second table of FIG. 3a, which yielded a 98.75% accuracy rate.

Conceptually, the segment size may be likened to determining how long a listener (in this case the computer) needs to "hear" a speaker to make a reasonable guess at identifying them. Operationally, speech is reviewed much faster than in real time.

To provide a sense of the effectiveness of SVM upon the subject derived feature space, FIG. 4a illustrates two example SVM partitions between speaker feature vectors. The GAD processing collapses information so that two-dimensional sub-spaces are often sufficient for segmentation. In the illustrated situation, the SVM partitions readily distinguish ED from AR and KC, respectively. As shown, the optimal atom pair for pair-wise discrimination between ED and AR are determined in this example to be atoms 24 and 9. When graphically plotted, the respective coefficient values for these atoms in the 30 representative sub-segment vectors (3 sub-segments/file×10 total files) for AR are clearly segregated from the respective coefficient values plotted for these same atoms in the 30 representative sub-segment vectors for ED about the divisional line shown. Similarly, the optimal pair for pair-wise discrimination between ED and KC are determined in this example to be atoms 9 and 73, such that when the respective coefficient values for these atoms in the 30 representative sub-segment vectors for KC and ED each are plotted, they too are clearly segregated into accurate groups by the divisional line shown.

Because the GAD processes are able to compactly represent information in very few atoms, attaining high divisibility of the space with only two feature atoms is typical. While higher dimensional partition spaces may be applied, the SVM in this example was limited to two-dimensional subspaces in the interests of simplicity and clarity. This eases visualization and eliminates any question of "over fitting" the data. The SVM employed in this example was also restricted to linear partitions for initial proof of concept purposes.

SVM is a technique known in the art of machine-learning. The application of SVM herein should not be interpreted narrowly to imply a specific implementation from prior art. As used herein, the SVM is directed to a computer implemented process that attempts to calculate a separating partition between two categories of data. The data is projected into a plurality of dimensions, and the partition will comprise a surface in a dimension less than that of the projection. Thus, in certain exemplary applications, data is projected in two dimensions, and a line comprises the partition surface. In three dimensions, the separating surface would comprise a plane; and, in N-dimensions, the separating surface would comprise a mathematical hyper-plane. Without loss of generality, it is possible to use curved surfaces in place of a linear surface for the partition.

In general, the partition effectively separates the data-space into two 'half' spaces, corresponding to the categories of interest. As mentioned, it is feasible to segment the space into more than two regions where necessary in other embodiments and applications. Linear surfaces and bi-section are preferably used for computational speed. As discussed in following paragraphs, a voting system is preferably constructed that enables multi-class data to be addressed deterministically. An advantage of the GAD methods used in combination with SVM is that high-accuracy decisions may often be made based on a sub-space of only two dimensions—which further reduces computational complexity. Algorithmic measures for calculating a partition line are not restricted; any fast approximating algorithm may be employed for a partition even if that algorithm works only in two dimensions. That too is referenced herein without limitation as SVM.

The leave-one-out test results for the given example demonstrate the automatic creation of viable feature vectors from natural speech segments. Robust common signature information may actually be extracted from the feature vectors, which can potentially be applied for clustering unknown speech segments into groups.

This example makes a tacit assumption that an indexed, classified corpus against which to compare a novel signal already exists. Automatic indexing and clustering in the absence of a fully indexed, classified corpus is next addressed.

Flagging Anomalous Speech Segments from Unfamiliar Speakers

A system formed in accordance with the exemplary embodiment disclosed may also differentiate between familiar and unfamiliar speakers. To do so, a null space is initially defined for the clustering process so that novel segments may be classified either into one of the existing classes or determined to be sufficiently dissimilar to all existing classes as to warrant the start of a new cluster of data. This situation may be replicated by leaving out speech segment files for entire speakers from the training corpus in the given example.

Figure 4B:
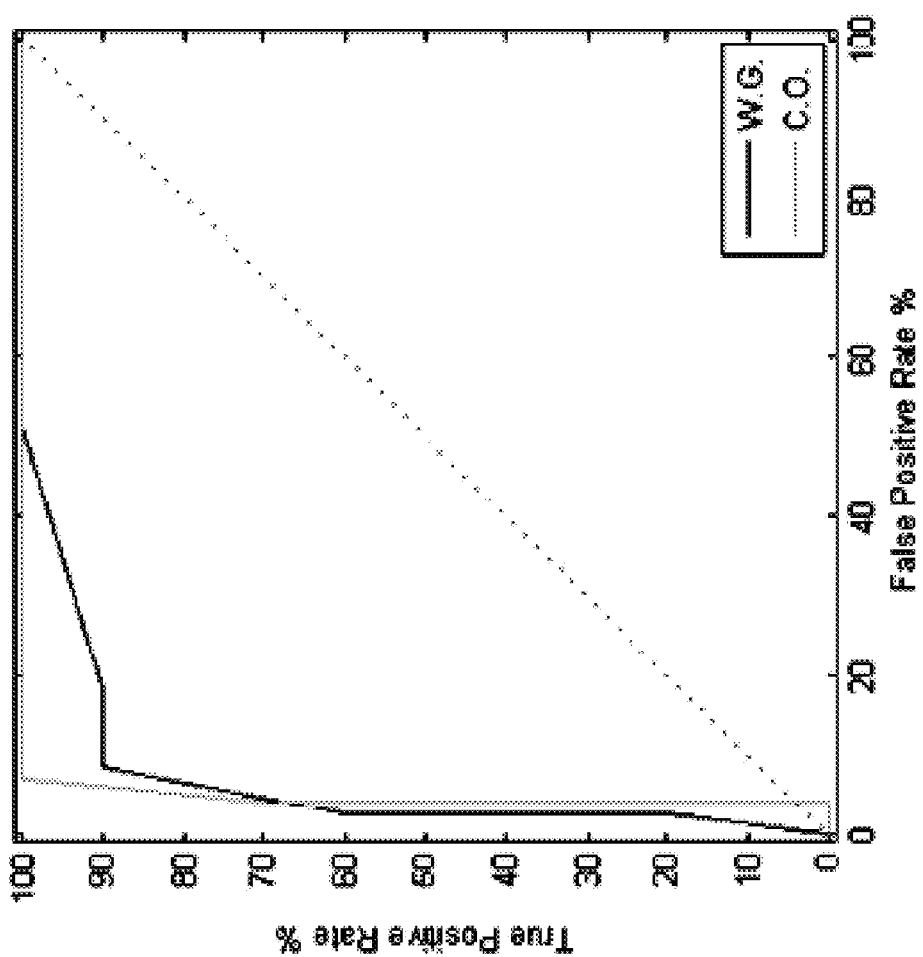
FIG. 4b is a set of illustrative ROC curves derived from certain test results obtained for illustrative purposes utilizing a system formed in accordance with the exemplary embodiment illustrated in FIGS. 1 and 2.

FIG. 4b shows two ROC curve for detection of novel speakers that are not in the training dataset. The illustrative ROC curves shown are generated first by treating all WG files (blue) as novel signal data and, in a second test, treating all CO files (green) as novel signal data. The ROC curves are each generated by adjusting a hidden threshold (in this example, the size of a null space) to vary the balance between a true positive rate and a false positive rate. Using such variable thresholding, the point is determined where a certain correct rejection is reached (denoting for instance that a rejected source of the given samples is not a known source) before a certain false positive rate is reached. False positives are continually traded off for true positives in this comparative process.

Success was determined for the illustrated ROC curves by correctly classifying the novel files into the null space rather than clustering them with other speakers, while false positives were determined for misclassifying other speaker files into the null space. Each curve was generated by varying a parameter determining the size of the null-space. Each was based on the same 80 speech sample files (10 for each of the 8 speakers) as in the preceding example, and on the same parameter settings (other than the null-space size).

As shown, the system is able to identify for example 100% of CO and 90% of WG files as dissimilar to the known corpus, with less than 10% of the other files called into question. This process in alternative embodiments may be augmented by using anomaly detection concepts developed in metric spaces.

Clustering for Similarity Searches Over Untagged Speech Segments

A system formed in accordance with the exemplary embodiment disclosed may also extend the non-parametric SVM approach to seek, or discover, clusters in the given data. The system flow proceeds by establishing the best separation sub-space for each pair of files. Excluding that pair, we test the remaining files and accumulate blind classification information in the sub-space. A voting process is then used to determine which files are most similar to which other files in accordance with the distribution of votes recorded for each.

Figure 5A:
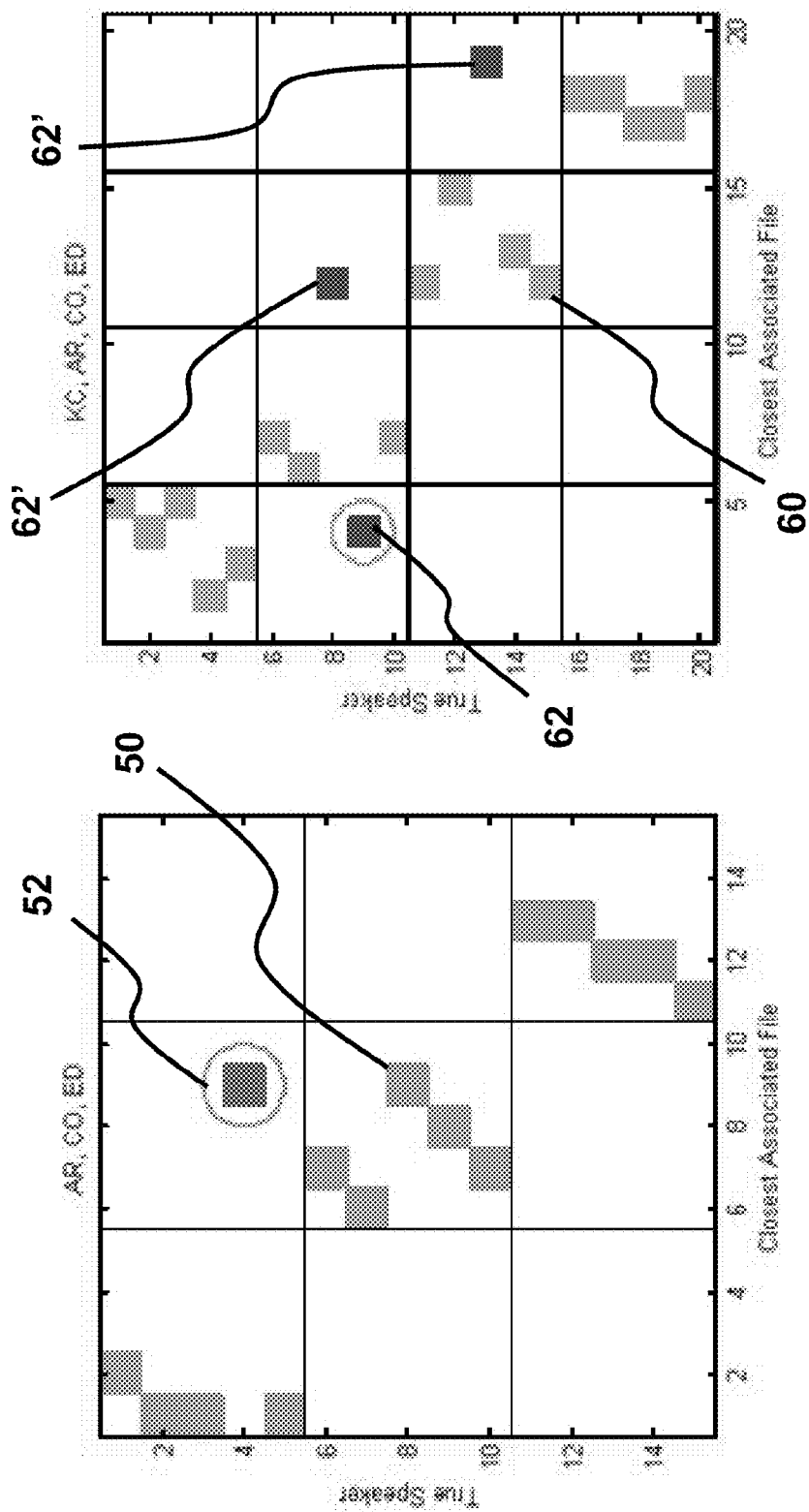
FIG. 5a is a set of illustrative graphic plots comparing certain test results obtained for distinguishing between sources of speech segments utilizing a system formed in accordance with the exemplary embodiment illustrated in FIGS. 1 and 2.

FIG. 5a illustrates preliminary automatic blind clustering results for the given example, where the 'green' block-diagonal structures 50, 60 indicate properly clustered speaker files. In this illustrative example, the results of a clustering run on three (top) and four (bottom) of the given speakers in the database, using five speech files each. The similarly shaded 'green' squares 50, 60 within the diagonal blocks are those properly co-associated by the system in the absence of any a priori knowledge, while the 'red' squares 52, 62, 62' represent misclassified files. Respectively, accuracies in blind clustering of 93.3% and 85% were realized.

Figure 5B:
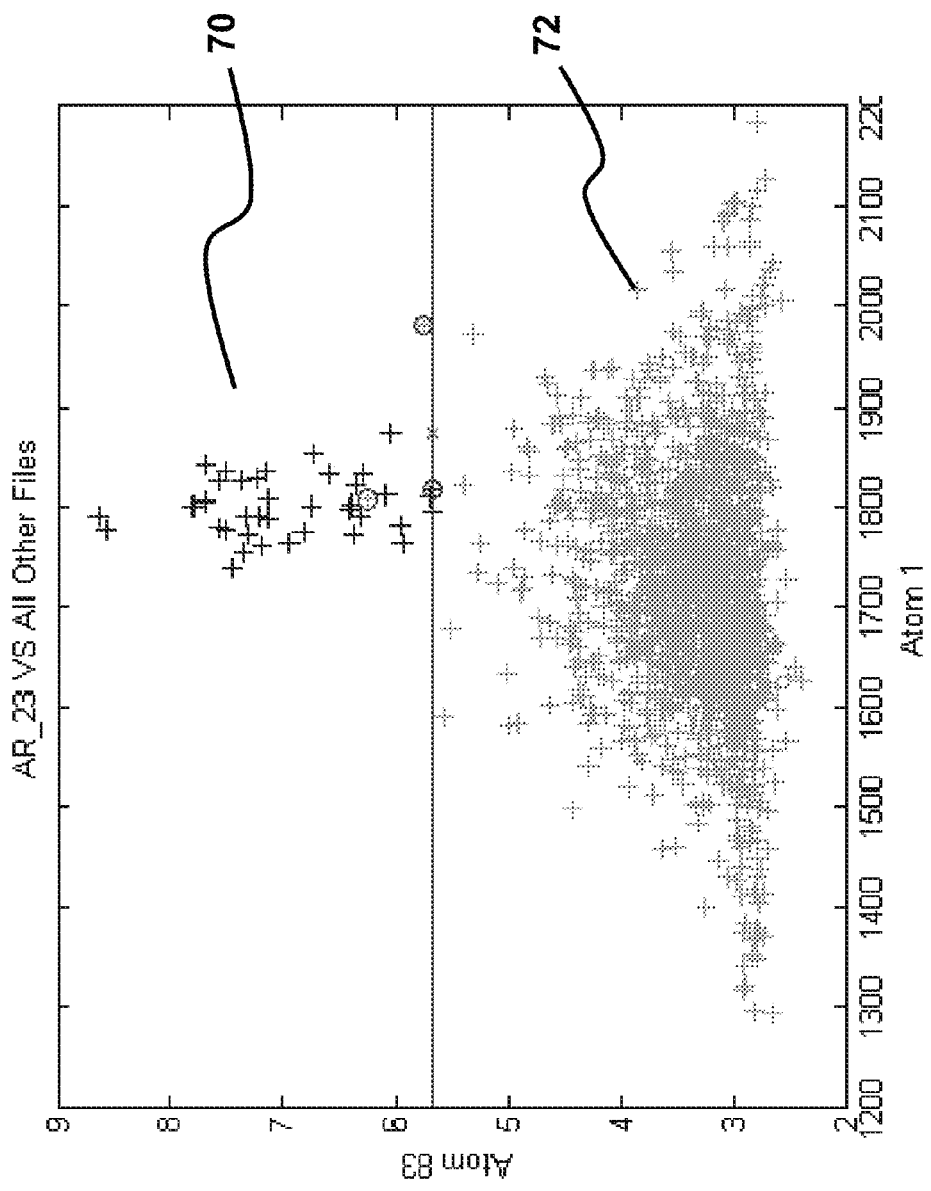
FIG. 5b is an illustrative graphic SVM plot of certain test results obtained visually indicating acoustic anomalies in speech segments received by a system formed in accordance with the exemplary embodiment illustrated in FIGS. 1 and 2.

A point of practical concern is that certain sound files have very different recording tones from others, and the system is apt to use these tonal features as a feature of separation for particular files. FIG. 5b illustrates that although files with anomalous audio aspects may be problematic, they can be detected, as enabled by use of GAD processing as disclosed herein. The Figure shows the best separation of the misclassified AR file (circled 'green' squares 52, 62 in FIG. 5a) from the entire set of file vectors (containing the properly co-associated 'green' squares). Clearly, substantially all of the points 70 in 'blue' are completely separated from the remainder of the population 72 in 'green' on only one atomic feature (atom 83 in the pair-wise decision space example illustrated). This one-against-the-world comparison provides an approach for detecting such anomalous files and, correspondingly, an approach for detecting candidate decision features that rely too closely on one file's unusual audio characteristics rather than on the voice of the speaker. Flagging such files and/or eliminating these atoms is an additional aspect of certain embodiments.

In addition to the non-parametric efforts illustrated, metric-space clustering may be applied in accordance with certain alternate embodiments.

Summary of Certain Related Elements of GAD Processing

Signature Extraction

A notable challenge in performing detection and classification in high-dimensional spaces is discovering and leveraging natural relationships which can be used to reduce the dimensionality of the data to a manageable decision space. It is preferable to concentrate the decisive information content into relatively few coefficients. Mathematically, one may assume that the target information lies on a relatively low-dimensional manifold that is embedded in the high-dimensional space. Practically, there are many approaches by which one may attempt to reduce raw data to this salient information.

Figure 7A:
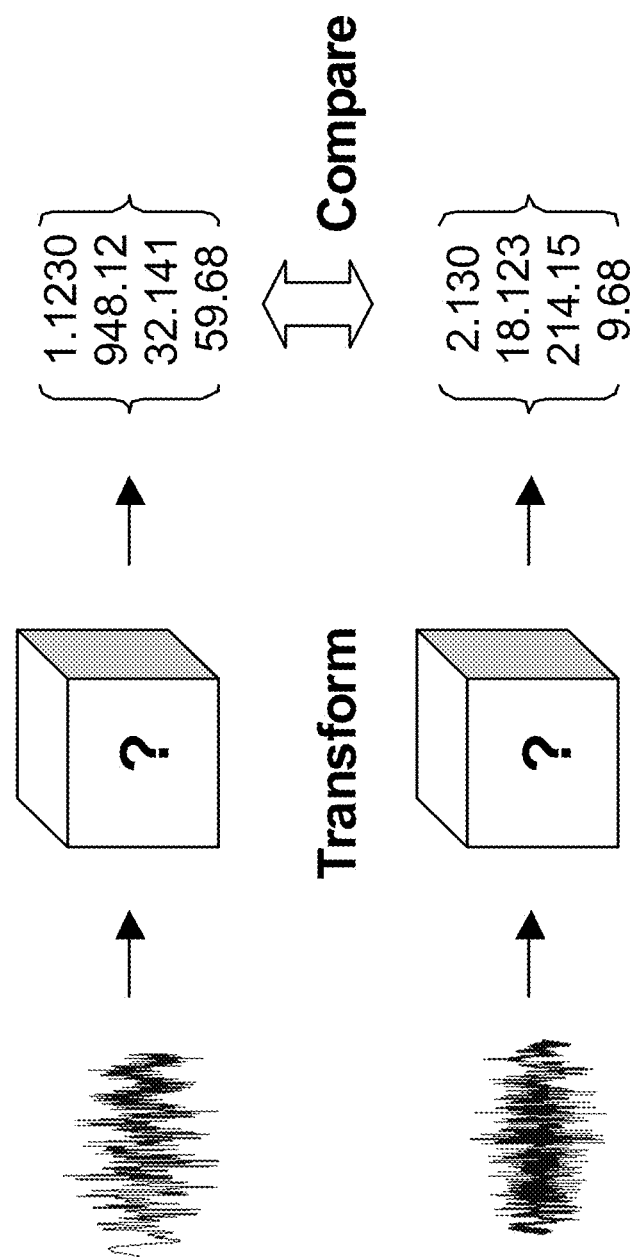
FIG. 7a is a schematic diagram generally illustrating a transformation process respectively applied to signals to obtain transformed representations thereof.
Figure 7B:
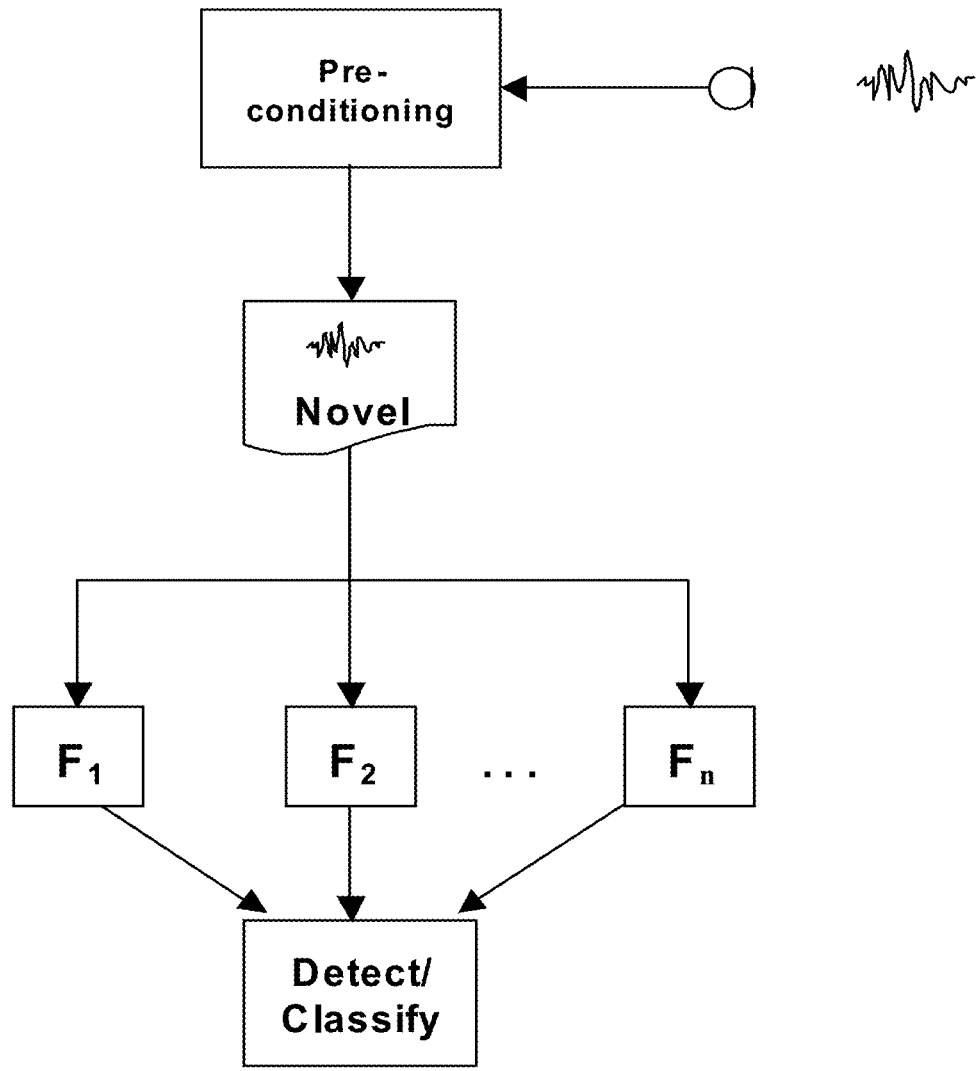
FIG. 7b is a schematic diagram illustrating the flow of processes for detection and clustering of new acoustic signals received in an exemplary embodiment of the present invention.

FIG. 7a illustrates the abstracted process of analysis, where sample signals are transformed so that they are represented by a set of features with corresponding values. An optimal transform to map signals into features is generally important in addressing signature discovery problems. The representation set of features is manipulated to discover group similarities and differences so that a typical signature can be extracted. The transform largely determines the success of the resulting system operation. Ideally, once a feature set is identified, a model similar to that shown in FIG. 7b may be applied for detection and classification. Effective detection and clustering are ideally performed using low-dimensional feature sets.

Standard signal processing tools based on fixed transforms such as Fast Fourier Transforms (FFTs), wavelets, or filter banks often obscure key feature information by distributing it over a large number of quantized bins. Approaches like Principal Component Analysis (PCA), Linear Discriminate Analysis (LDA), and related nonlinear kernel methods share certain downsides with all statistical matching methods. Even though they may transform data to reduce dimensionality, these methods remain dependent on consistency in the sampled feature set. If selected features jitter, drift, or otherwise vary significantly, the probability of resolving underlying structure or of detecting a known signature diminishes rapidly.

In contrast, greedy algorithms known in the art work to concentrate interesting information into fewer, more robust features. Historically, greedy algorithms have been under utilized in signature identification tasks in part because it is difficult to compare one analyzed signal to another when different features are extracted. As various applications of GAD demonstrate, simultaneously analyzed collections of signals overcome many prior limitations. The GAD processing applied herein effectively removes jitter and de-blurs data. By compactly re-representing the data in a reduced dimensional feature space, GAD facilitates discovery of signatures at the front end, reducing subsequent computing costs and significantly increasing the probability of success with further statistical processing.

Greedy Adaptive Approximation (GAD) Processing

Mechanisms and methods for discovering and extracting signatures in data are described in [1] and [2]. The set of methods are described collectively herein as Greedy Adaptive Discrimination ("GAD"). Below is a brief summary of the GAD processing disclosed in more detail in [1] and [2], aspects of which are incorporated in the embodiments disclosed herein.

A "GAD Engine" comprises a Simultaneous Sparse Approximator (SSA), a dictionary of prototypical atoms, a structure book memory system, and one or more discrimination functions that operate on the structure books. The SSA takes as input a collection of signals and produces as output a low-dimensional structure book for each signal. Each structure book describes a decomposition of a corresponding signal and comprises a list of coefficients and a corresponding list of atoms. Working as an example in one dimension, a signal f(t) may be represented as follows:

$$f(t) = a_0 g_0 + a_1 g_1 + \ldots + a_n g_n + r;$$

where $a_i$ are the coefficients and $g_i(t)$ the atoms or prototype-signals of the decomposition, and r is the residual error (if any) after n+1 terms. If r(t)=0, then the representation is exact; otherwise the decomposition is an approximation of f(t). One way to understand a structure book is as a set of ordered pairs $(a_i, g_i(t))$ for each i; however, an actual engine typically utilizes more efficient internal coding schemes. Note that while the output of the SSA may be orthogonalized, the subject system and method are best served by maintaining redundant representation, sometimes referred to as a frame in mathematical literature, to distinguish it from the more familiar idea of a vector basis.

The atoms $g_i(t)$ belong to a highly redundant dictionary D of prototype signal elements. Using a redundant source dictionary rather than a fixed decomposition set (such as on a Fourier or wavelet basis) allows the GAD to substantially reduce the dimensionality n of the resulting decomposition for a given error $\epsilon$, with $|r| \le \epsilon$. Those skilled in the art familiar with other adaptive approximation schemes, such as Matching Pursuits, will recognize that this reduced dimensionality generally comes at a price, as structure books from multiple signals are not mutually compatible. A unique feature of the GAD architecture is an SSA that produces redundant sparse approximations such that the atoms of any structure book may be compared directly to those of any other structure book in a very low-dimensional space. Thus, for a set of simultaneously approximated data functions $\{f^i\}$ decomposed over an index set $y \in S$, the following equality holds:

$$f^i = \sum_{y \in S} a_y^i g_y^i + r$$

In the simplest implementation, selected atoms may be identical for all generated structure books in the collection. However, the GAD SSA is also able to extract atoms from the signal collection that are similar rather than identical, i.e. $g_y^i \ne g_y^j$, $i \ne j$. This unique feature is highly advantageous because it allows the GAD engine to automatically account for noise, jitter, drift, and measurement error between the signals. The GAD Engine permits the range of "similarity" between atoms across structure books to be controlled by setting Δ-windows for the parameters of the dictionary. These windows may be either fixed or adapted dynamically.

The resulting sparse structure books are further processed within the GAD engine by suitable discrimination operations. Each operation takes as input one or more structure books and produces as output one or more additional structure books. Operators include set theoretic operations and threshold tests, among others, that are utilized to sub-select atoms and extract similarities and differences between classes of signals. An operation of particular interest for signature extraction is the parametric mean, detailed in [1], which produces a single structure book representative of the "average" or "typical" signal in a collection.

Another notable benefit of the GAD Engine is that the resulting structure books may be averaged, subtracted, or otherwise manipulated. Also, any derived structure book retains sufficient information to reconstruct therefrom a representative model signal in the original signal space. In particular, this makes it possible to calculate a parametric mean of a class of signals and then reconstruct a "typical" signature signal from that data for further analysis, comparison, etc. Hence, GAD provides useful signature information to many conventional signal discrimination systems. Taken together, the components of a GAD Engine define a very flexible tool for manipulating and discriminating signals.

Figure 8:
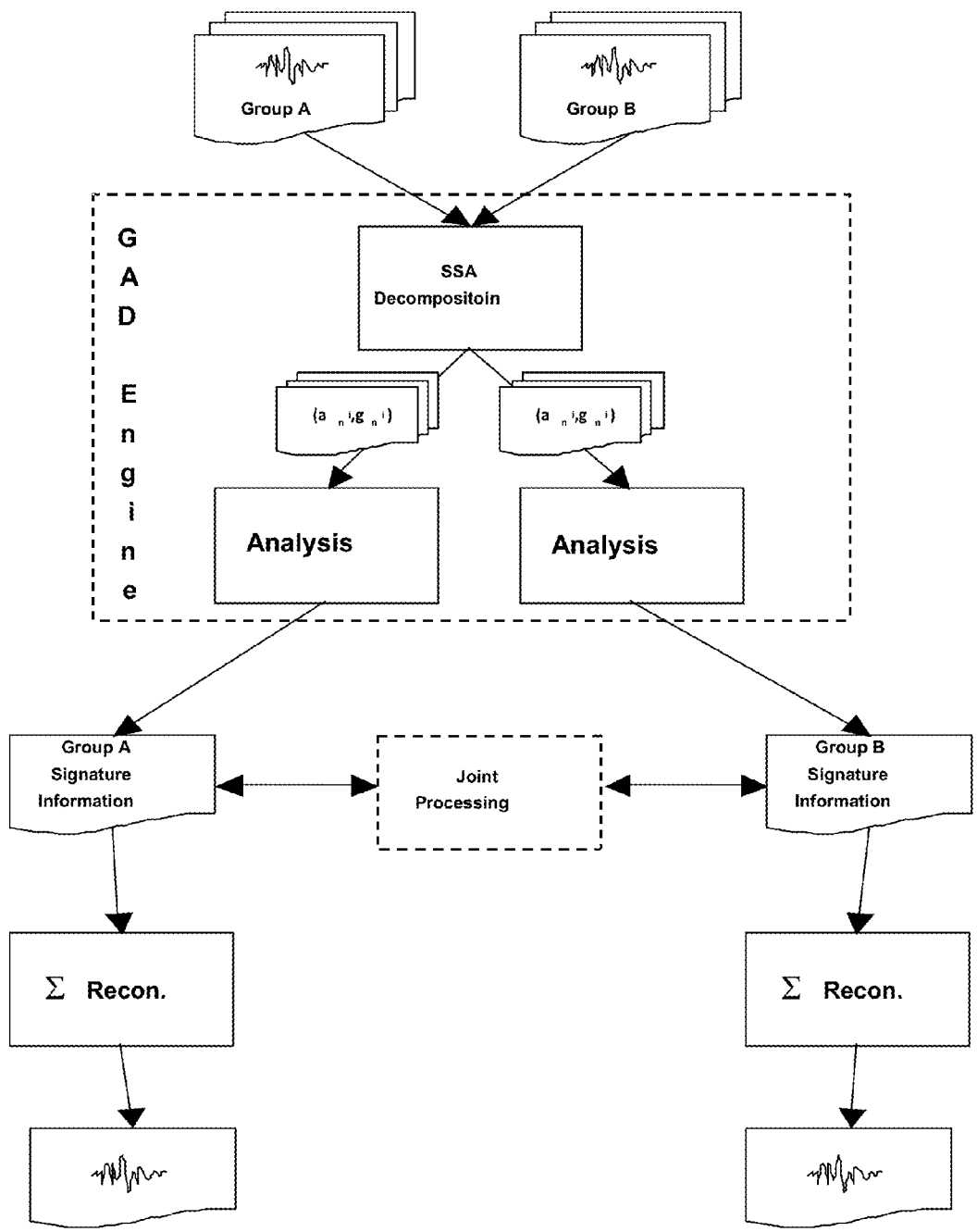
FIG. 8 is a schematic diagram illustrating a flow of processes within a simultaneous sparse approximation operation executed in an exemplary embodiment of the present invention.

FIG. 8 outlines an exemplary GAD signature extraction system, employing a general GAD processing engine as described in [1] and [2]. Use of groupings as shown (with GAD and the simultaneous sparse approximation processes described in [1] or others as considered in [2]) provides considerable processing advantages. Signature data is collected and divided into classes, typically representing a positive condition in which the target signature is present and a negative condition in which only background or distracter signals are present. The classes are analyzed using the SSA method, resulting in a collection of structure books (labeled SBs in the figures) for each class of signal. Preferably, this and other processing steps described in connection therewith are carried out on a computer platform in programmably configured processing with respect to the previously generated signature dictionary.

A carefully defined parametric-mean operation is performed on each class to produce a signature structure book for each signal class. As noted, these signature structure books effectively provide a list of key time-frequency features relevant to discriminating the class, together with coefficient values indicating their proportionate prominence. The processing may then compare the signature structure books to further extract contrasting elements. Note that the system may also be applied spatially to extract spatial as well as temporal patterns of interest. The signature structure books may also be reconstructed into "typical" time-domain waveforms that are representative of a class of signals. Thus GAD signature extraction may feed a variety of other detector designs.

GAD signature extraction proceeds by finding a parametric mean for one or more classes of signals and comparing the resulting structure books to each other and to statistical estimates of expected values in background noise. A variety of suitable methods may be employed by which to find the best discriminators. The choice of such methods depends on the particular requirements imposed on detector design by the intended application.

GAD is compatible with various known detector/classifier architectures, any of which may be used as tools in the exemplary embodiment disclosed herein. An SVM approach is illustratively applied in the disclosed examples.

It should be noted that the GAD Engine may be replaced where necessary, within the scope of invention, with other suitable tools for executing simultaneous sparse approximation.

GAD Applied to Speech Data

As described with reference to FIG. 1 and FIG. 2, GAD is applied in the disclosed embodiments not directly to original signals, but rather to log power spectra obtained from Fourier transformed versions of the original signals. Thus, by using a Gabor type dictionary under GAD, a sparse tiling of the plane is obtained which comprises frequency modulation vs. the original domain of these log-spectral signals. Consequently, the resulting atoms correspond mathematically to parametric descriptions of cepstral coefficients (i.e. quefrency) vs. frequency, or the C-F plane. Phase and scale information are also obtained. What results is a derived data set that is much more precise in its description of the underlying speech than a general cepstrum obtained by other methods.

The sparse adaptive C-F tiling obtained by using GAD with a Gabor dictionary, following a spectrogram of FFT, comprises an extended descriptive framework when compared to classical cepstrum analysis. The Gabor dictionary includes Fourier elements, which in the present context mimic cepstrum coefficients when applied to the log power of the spectrogram FFT vectors. However, the preponderance of Gabor dictionary elements are modulated by a Gaussian envelope of finite scale σ. Thus, cepstrum-like elements of finite frequency extent may be suitably modeled. Moreover, by using this dictionary un-modulated Gaussian elements may be considered, which in the present context represent individual frequency bands of wide or narrow extent. As disclosed in reference [1], the Gabor dictionary includes an infinitely redundant parameterized set of spanning frames. Thus, the sparse adaptive C-F tiling is significantly more flexible than a typical fixed-transform cepstrum analysis known in the art. Its use leads to extremely compact representations of the information content in many classes of signals. Compression of information into a very low dimensional space enables efficiency in the SVM layer that would not otherwise be possible.

FIG. 6 illustrates the collection of data to form the GAD signal space. Continuous speech is analyzed into a spectrogram (101) and divided into segments. These may or may not be contiguous segments as shown; such has no effect on further processing. Each segment is subdivided into spectral-segments, corresponding to one column in the spectrogram. These log power spectra 102 form the signals 103. They may be viewed individually as power-spectra 104. The super set of spectral-segment spectra for all spectral-segments of all segments comprise the signal set of interest for sparse approximation.

Figure 9:
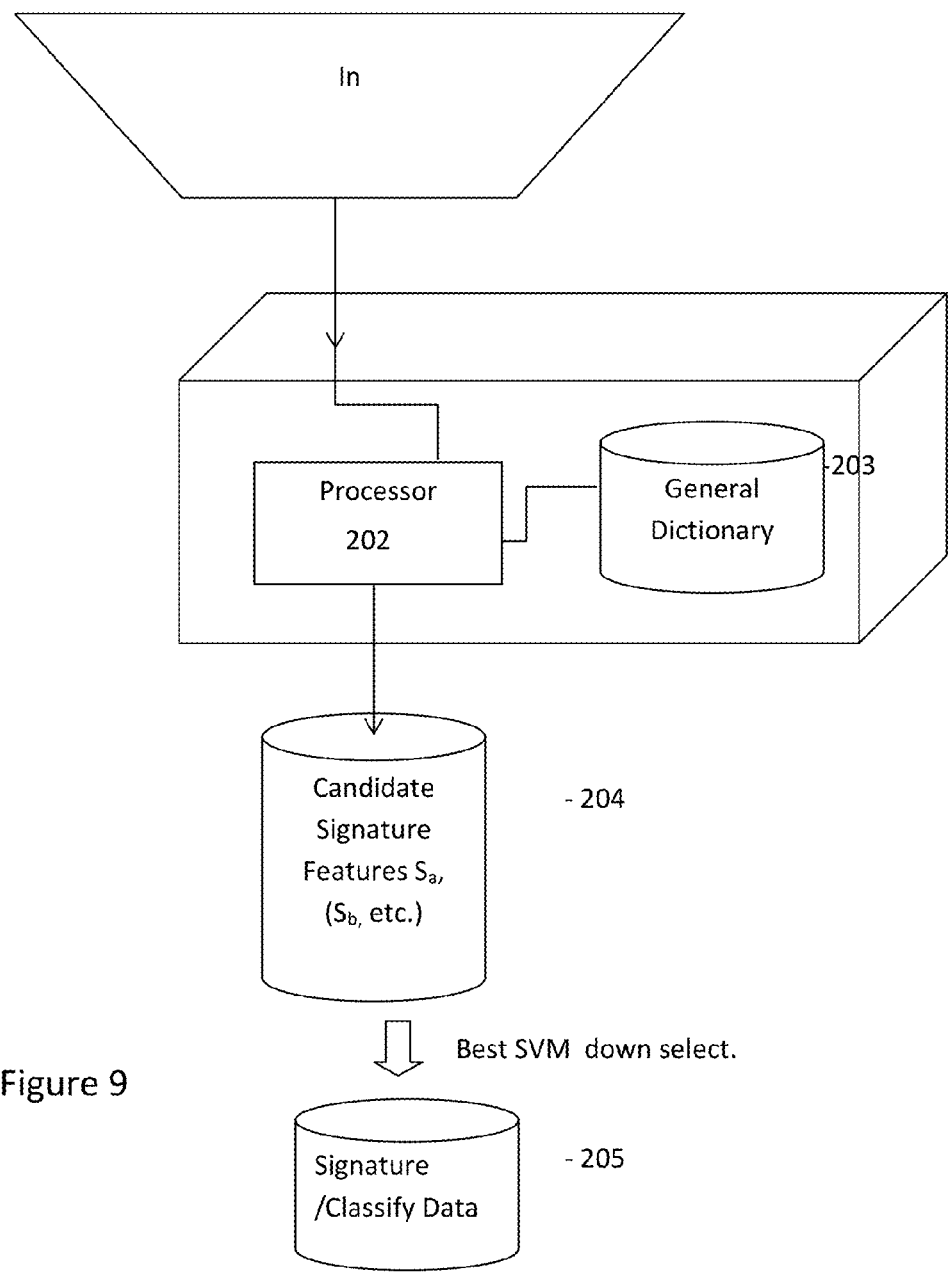
FIG. 9 is block diagram schematically illustrating an interconnection of system modules and flow of data within a processing portion in accordance with one exemplary embodiment of the present invention.

FIG. 9 illustrates the link between the processing flow illustrated in FIG. 1 and FIG. 2 to GAD processing. The spectral vectors of each brief speech spectral-segment form the "signals" 201 for GAD processing. These are analyzed to form an SSA by a processor 202 with respect to a general dictionary 203 that may comprise any suitable set of known prototype functional elements (i.e. atoms) for use in describing pertinent signal features in the intended application. For each speech segment (a, b, c, . . . ), the processor 202 preferably also performs a p-mean as described in references [1] and [2] to produce a set of representative signatures $S_a$, $S_b$, etc., 204 each expressed in terms of a medium dimensional (e.g. 100-200) set of common candidate features. In certain embodiments, a spectral-segment can correspond to a sub-segment as described elsewhere; however, the sub-segment preferably span multiple spectral-segments. This allows for significantly more flexible tuning of parameters so that both the spectrogram STFT windows and the number of vectors per speech segment may be optimized. The p-means in this embodiment are typically generated over each of the sub-segments that comprise each segment, so that each sub-segment p-mean represents data collapsed over the set of its component spectral-segments. Thus, there is one representative joint decomposition result for each sub-segment. Other SSA methods may be applied without departure from the spirit of the invention.

The representative signatures of the resulting set are then processed by the finding the best SVM separation for each possible speech segment super-group (i.e., each speaker). This produces a very low dimensional set of signature feature elements (such as atoms in the disclosed embodiments) and classification data 204 that reliably discriminate between the target groups.

Summary of Certain Related Elements of SVM Derived Processing

As described in preceding paragraphs, the principal of sparse, adaptive C-F tiling to achieve a small set of optimized discrimination features provides amongst other advantages the ability to distinguish signal segments independent of how their information is subsequently processed. Preferably, the data is processed using an SVM based scheme.

SVM and Feature Selection

Once the given signals have been put through GAD, distinctive atoms are formed for all signals. Each signal's amplitude for each atom may be used as features to discriminate between, or divide, speakers. Using this information, the atom locations for the features that provide the best division between two groups are determined. All possible features are paired together to find the line that intersects the division point and results in the fewest number of misclassifications of the data. The feature pairings are then ranked based on the number of misclassifications, and best pairing is chosen. This is simple if there is only one pairing that does the best, but more problematic if a tie results. To nonetheless select the features that best separate the groups in that event, the distance from the line for all points is calculated. All points are accordingly weighted based on distance from the line, such that points closer to the line are weighted stronger than points farther from the line. This favors a division line that more consistently puts all signals a little bit off from the line over one that erratically puts some signals quite far from the line and other signals very close to the line.

Figure 10:
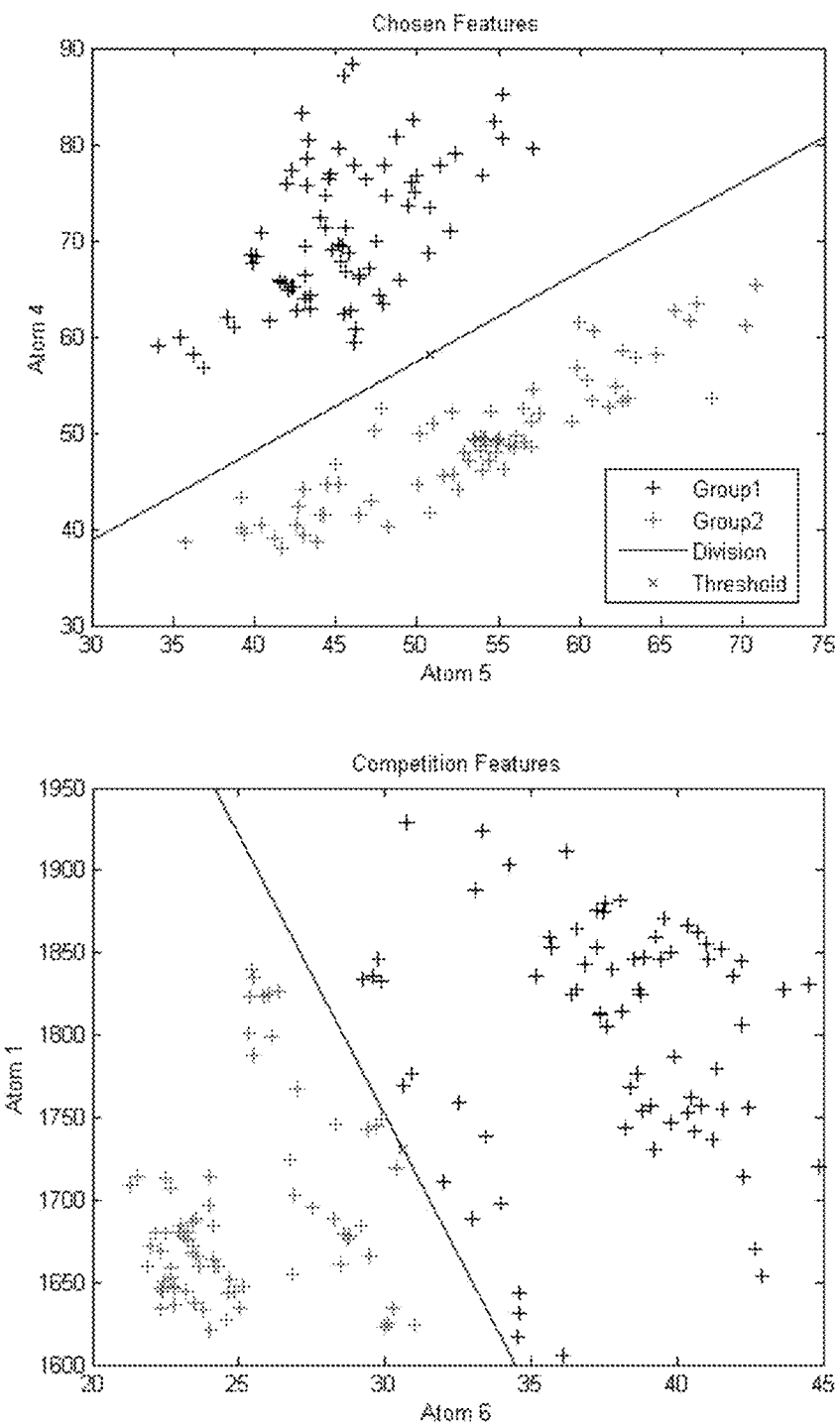
FIG. 10 is a set of illustrative graphic SVM plots of certain test results obtained for determining an optimal feature pair to distinguish between speech segments of two paired sources, utilizing a system formed in accordance with the exemplary embodiment illustrated in FIGS. 1 and 2.

An example is graphically illustrated in FIG. 10, where as part of feature selection, two potential feature sets for the same data are considered. The first feature pair shown is chosen over the second feature pair shown which had been in competition for the choice.

Preferably, the weighting function employed is a Gaussian defined by the equation:

$$\text{weight} = \left(\frac{r}{R}\right) * e^{\frac{\left(\frac{r}{R}\right)^2}{2-\sigma^2}}$$

where r represents the distance from the point to the line, R represents the maximum distance between any point (including points not in the two groups) and the line, and σ (the standard deviation) is set to a value of 0.05. Each correctly classified point from both groups is accordingly weighted, and the weightings summed. The best feature pairing is defined to be the one with the greatest summation.

Speaker Identification/Classification/Clustering by Non-Parametric Voting

As described in preceding paragraphs, the best pair of features on which to separate between every pairing of speakers is determined. Thus, for 8 different speakers, 28 pairs of best features are obtained from the 28 separate pairings of speakers (speakers 1 vs. 2, 1 vs. 3, 1 vs. 4, 1 vs. 5, . . . , 7 vs. 8) in the noted data set example. Each new signal addressed is compared to all of these pairings/separations to determine which speaker group to put the new signal in.

Figure 12:
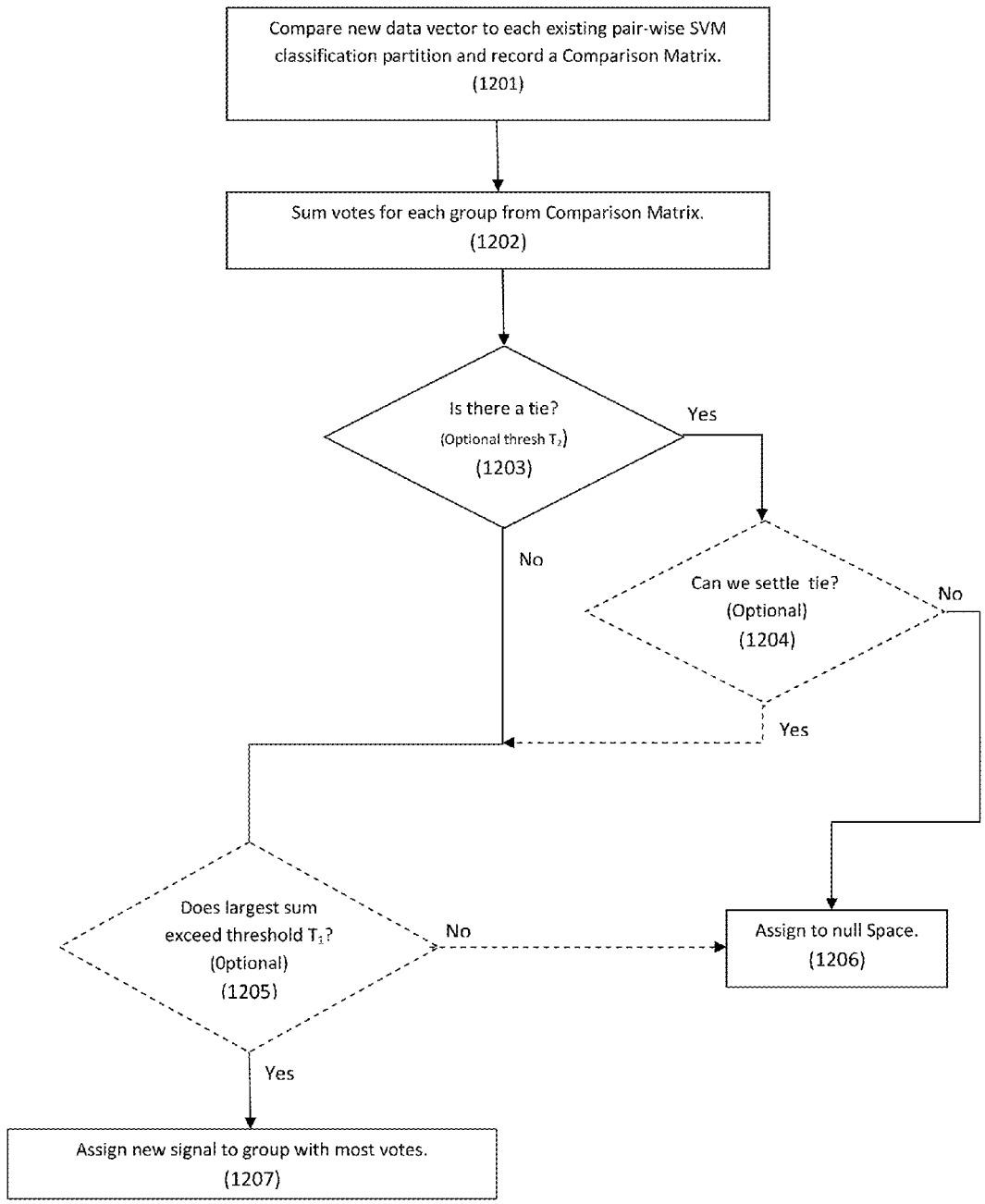

FIG. 12 illustrates the flow of steps in an exemplary example of this process. A new, or input, signal is projected into the same decomposition space used to separate training data, as illustrated in FIG. 2. The new signal is thus represented as a set of sub-segment vectors, each of which includes descriptive coefficients in the same set of sparse-adaptive C-F atoms as is used in each of the pair-wise comparisons. Those vectors are thereby projected into each decision space of interest to determine within which of the particularly paired groups the they fall. For example, in FIG. 4a, two comparisons are shown for illustrative purposes in two dimensions. A new signal would be projected into the first space by using its coefficients for Atoms 9 and 24, so as to determine whether the new signal is more similar to AR or to ED (of the paired 'groups') based on which side of the dividing line it falls. The same new signal would also be projected into the second space by using its coefficients for Atoms 73 and 9, so as to determine whether the new signal is more similar to KC or ED (of the paired 'groups') by observing on which side of the line it falls. The individual determinations in connection with each pair-wise decision space represent votes for one or the other of the groups in each pairing. Comparison results are thus obtained in this example for each new signal.

This results in a comparison matrix, such as shown in Table 1 of FIG. 11, that indicates where the signal was grouped for each comparison. A value "1" indicates a vote for the group corresponding to the row of an entry, while a value "2" indicates a vote for the group corresponding to the entry's column. To tally the votes, a count is taken for each row to determine the number of 1's in each row. A count is also taken for each column to determine the number of 2's in each column. The row and column votes are summed to obtain the total number of votes for each group.

The maximum number of votes any group can receive is equal to the total number of groups minus one (one vote for each comparison of the group with all other groups). Thus each sub-segment data vector includes a total of $$\sum_{i=1}^{nGroups-1} i \equiv \binom{nGroups}{2}$$

votes, of which a maximum of (nGroups-1) may be given to any single group, where nGroups is the number of groups in which the new signal may potentially be classified. To classify a signal, the group having the most votes is found. The signal is then placed in that group, as indicated by block 1207 of FIG. 12. In an ideal case, one group would receive the maximum number of possible votes, obviating the possibility of a tie.

In the event that no single group receives a maximum number of votes, there will exist multiple groups with the same number of votes. In certain embodiments, a null group is established to represent the state where the group to which a signal belongs cannot be determined. The signals put in this null group are precisely the signals that experience ties for the maximum number of votes, as illustrated by block 1203 of FIG. 12.

This can be limited further, in certain embodiments, with a tie breaker (block 1204) such as for example: in the event of a tie between two groups, using the matrix element corresponding to the direct comparison between the two tying groups to place the signal into one of these groups. FIG. 11 illustrates an example of a situation where a tie between two groups, namely groups 5 and 8 in this illustration, must be broken for the new signal. Table 1 shows the comparison matrix structure which arrays the entries with respect to all comparisons between different combinations of group pairings. Using this comparison matrix structure, if a tie between, say, groups 5 and 8 needed to be broken for the new signal, then the matrix element in the $5^{th}$ row, $8^{th}$ column that shows the result of direct comparison of the new signal concurrently against these two groups (in the decision space for that group pairing) would be turned to, and the decision value derived their would be applied to classify the new-signal. This effectively makes the null group smaller by eliminating two way ties.

Additionally, in certain embodiments, classifications may be thresholded. That is, the maximum number of votes may be compared with a threshold value $T_1$, and if the top group does not receive enough votes, it is put in the null space (1206). (See the optional block 1205 of FIG. 12, shown in broken lines.) This effectively increases the size of the null space. This approach allows for identification of novel speakers (i.e., those new signals that are dissimilar to all others prior), rather than forcing an erroneous grouping with the least dissimilar or any other of the known speakers. This also allows for automatic clustering of data without reference to a previously indexed set.

Table 2 of FIG. 11 illustrates a sample comparison matrix for eight groups. In this instance, Group 1 received the most votes for a new signal, so the signal would be placed in that group. Entire files of signals may be classified in this manner. For each signal, a comparison matrix is similarly generated. The initial method of deciding for the file was to use the groupings for all signals in the file. A list of signals and groups in which they are put is formed, then a count is taken to determine which group had the most signals, and place the file in the winning group.

Using this non-parametric decision criteria, there are numerous ways to resolve null grouped signals. In certain embodiments, a vote may be accumulated to put the file in the null group, while in others the otherwise null signals might simply be ignored. Note that a file null space may be maintained even if no voting result for a signal is associated with a null group per se. In certain embodiments, the null space may result from ties between the signal votes, or from additional voting relative to an additional threshold.

In the exemplary embodiment disclosed, the method was extended to gather all of the comparison matrices for all signals in a file. In this way, the signal vote for the groups was accumulated. Instead of piecemeal deciding the group to which a signal belongs, all of the group votes were summed to make a joint decision, placing each signal in the group(s) with the maximum number of votes.

If there are multiple groups that tie, the file would be placed into the null space. As before, to increase the size of the null space, an additional threshold $T_1$ may be introduced; all files not receiving enough votes to exceed the threshold $T_1$ for joining an existing group are thus put into the null space.

Again, other embodiments may take related routes, such as a middle ground between the full comparison matrix method and the initial signal vote method. Typically, the top group(s) for all signals are found, and the votes derived from the row and column corresponding to the top group are used in the comparison matrix. If multiple groups happen to receive the same number of votes, all tying rows and columns are used, with the votes being divided by the number of groups in the tie.

In accordance with yet another alternate embodiment, instead of (or in addition to) comparing the maximum vote count to a threshold $T_1$, a difference between the top two vote counts may be compared to a threshold $T_2$. Thus, block 1203 in FIG. 12 would be modified to define a tie as including any groups within $T_2$ votes of the same value. One effect of this is to create a more dramatic change in the size of the null space with small changes in the threshold.

Methods and systems described herein have myriad applications, including government and security related monitoring operations and Web-audio database search applications. Another notable application is for a Smartphone/PDA application that can assist in identification of speakers from their audio in near real time, combined with a web database access to known classification vectors. This would provide a very powerful tool for the mobile user to identify famous speakers in the same way one can presently search against song databases.

These methods will have broad application apparent to those skilled in the art once they have understood the present description. With appreciation of the novel combinations of elements disclosed in the specification and figures and the teachings herein, it will be clear to those skilled in the art that there are many ways in which the subject invention may be implemented and applied. The description herein relates to the preferred modes and example embodiments of the invention.

The descriptions herein are intended to illustrate possible implementations of the present invention and are not restrictive. Preferably, the disclosed method steps and system units are programmably implemented in computer based systems known in the art having one or more suitable processors, memory/storage, user interface, and other components or accessories required by the particular application intended. Suitable variations, additional features, and functions within the skill of the art are contemplated, including those due to advances in operational technology. Various modifications other than those mentioned herein may be resorted to without departing from the spirit or scope of the invention. Variations, modifications and alternatives will become apparent to the skilled artisan upon review of this description.

That is, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A system for distinguishing between a plurality of acoustic sources generating sound in the form of unconstrained acoustic signals captured therefrom, comprising:
   a transformation unit applying a spectrographic transformation upon each time-captured segment of unconstrained acoustic signal generated by one of a plurality of distinct acoustic sources, said transformation unit generating a spectral vector for each said segment;
   a sparse decomposition unit coupled to said transformation unit, said sparse decomposition unit selectively executing in at least a training system mode a simultaneous sparse approximation upon a joint corpus of spectral vectors for a plurality of unconstrained acoustic signal segments from at least a subset of the distinct acoustic sources, at least one of said spectral vectors generated by the spectrographic transformation, said sparse decomposition unit generating at least one sparse decomposition defined in a multi-dimensional space for each said spectral vector in terms of a representative set of decomposition atoms;
   a discriminant reduction unit coupled to said sparse decomposition unit, said discriminant reduction unit being executable during the training system mode to down-select from said representative set of decomposition atoms an optimal combination of atoms for cooperatively distinguishing acoustic signals emitted by different ones of the distinct acoustic sources; and,
   a classification unit coupled to said sparse decomposition unit, said classification unit being executable in a classification system mode to:
      project a spectral vector of an input acoustic signal segment onto said multi-dimensional space to generate a sparse decomposition therefor as a coefficient weighted sum of said representative set of decomposition atoms,
      discover for said sparse decomposition of an input acoustic signal segment a degree of similarity relative to each of the distinct acoustic sources, and
      determine one of the distinct acoustic sources to have generated the input acoustic signal segment as sound, according to the degree of similarity.

2. The system as recited in claim 1, wherein said discriminant reduction unit includes a Support Vector Machine (SVM) portion programmably implemented therein, said SVM portion pair-wise comparing the distinct acoustic sources in sparse decomposition to selectively determine said optimal combination of atoms for each said pair-wise comparison.

3. The system as recited in claim 2, wherein said SVM portion determines for each said pair-wise comparison of sources a two-dimensional decision subspace defined by a corresponding pair of optimal atoms; and, said classification unit executes a non-parametric voting process iteratively mapping corresponding portions of said input acoustic signal segment sparse decomposition to each said decision subspace.

4. The system as recited in claim 3, wherein at least one said acoustic signal segment is of known distinct acoustic source prior to initiation of the training system mode, said sparse decomposition and discriminant reduction units thereby executing in the training system mode to identify a distinct class corresponding to the known distinct acoustic source.

5. The system as recited in claim 3, wherein none of said acoustic signal segments is of known distinct acoustic source prior to initiation of the training system mode, said sparse decomposition and discriminant reduction units thereby executing in the training system mode to cluster together similar ones of said segments.

6. The system as recited in claim 3, wherein a plurality of sub-segments are delineated within each said segment;
wherein said sparse decomposition unit generates over each said sub-segment a parametric mean of said sparse decompositions, each said sub-segment parametric mean being defined in terms of said representative set of decomposition atoms; and
wherein said simultaneous sparse approximation and parametric mean are carried out according to a greedy adaptive decomposition (GAD) process.

7. The system as recited in claim 6, wherein:
said spectrographic transformation includes a Short-Time-Fourier-Transform (STFT) process, and said spectral vectors are defined in a time-frequency domain; and,
said sparse decompositions are each defined in a cepstral-frequency domain as a coefficient weighted sum of said representative set of atoms.

8. The system as recited in claim 7, wherein said segments of acoustic signals include time-captured audio recordings of speech, and the distinct acoustic sources include individual speakers.

9. The system as recited in claim 8, wherein said GAD process references a Gabor type dictionary for representation of said sparse decomposition as a sparse adaptive tiling of a C-F plane.

10. The system as recited in claim 7, wherein said segments of acoustic signals include time-captured audio recordings of speech; and, the distinct acoustic sources include distinct groups of speakers, each distinct group of speakers having a predetermined shared attribute selected from the group consisting of: common language, common gender, common ethnicity, common idiosyncrasies, common verbal tendencies, and common exhibited stress level.

11. The system as recited in claim 7, wherein said segments of acoustic signals include time-captured audio recordings of non-verbal sounds emitted by sources selected from the group consisting of: non-human creatures, inanimate objects, machinery, and natural phenomena.

12. The system as recited in claim 7, wherein at least one of the transformation unit, sparse decomposition unit, discriminant reduction unit, or classification unit is implemented as part of a mobile communication device, and
wherein the mobile communication device captures parts or all of the unconstrained acoustic signals.

13. A method for distinguishing between a plurality of acoustic sources generating sound in the form of unconstrained acoustic signals captured therefrom, comprising the steps of:

applying a spectrographic transformation upon a plurality of time-captured segments of unconstrained acoustic signals to generate a spectral vector for each said segment, said unconstrained acoustic signals generated by one of a plurality of distinct acoustic sources;
selectively executing in a processor a sparse decomposition of each said spectral vector, said sparse decomposition including in a training system mode a simultaneous sparse approximation upon a joint corpus of spectral vectors for a plurality of unconstrained acoustic signal segments from at least a subset of the distinct acoustic sources, at least one of said spectral vectors generated by the spectrographic transformation, executing at least one sparse decomposition defined in an multi-dimensional space for each said spectral vector in terms of a representative set of decomposition atoms;
executing discriminant reduction in a processor during the training system mode to down-select from said representative set of decomposition atoms an optimal combination of atoms for cooperatively distinguishing acoustic signals emitted by different ones of the distinct acoustic sources; and,
executing classification upon said sparse decomposition of an input acoustic signal segment during a classification system mode, said classification including executing a processor to:
project a spectral vector of said input acoustic signal segment onto said multi-dimensional space to generate a sparse decomposition therefor as a coefficient weighted sum of said representative set of decomposition atoms,
discover a degree of similarity for said input acoustic signal segment relative to each of the distinct acoustic sources, and
determine one of the distinct acoustic sources to have generated the input acoustic signal segment as sound, according to the degree of similarity.

14. The method as recited in claim 13, wherein said discriminant reduction includes carrying out a Support Vector Machine (SVM) process pair-wise comparing the distinct acoustic sources in sparse decomposition to selectively determine said optimal combination of atoms for each said pair-wise comparison.

15. The method as recited in claim 14, wherein said SVM process determines for each said pair-wise comparison of sources a two-dimensional decision subspace defined by a corresponding pair of optimal atoms; and, said classification includes a non-parametric voting process iteratively mapping corresponding portions of said input acoustic signal segment sparse decomposition to each said decision subspace.

16. The method as recited in claim 15, wherein at least one said acoustic signal segment is of known distinct acoustic source prior to initiation of the training system mode, said sparse decomposition and discriminant reduction units thereby executing in the training system mode to identify a distinct class corresponding to the known distinct acoustic source.

17. The method as recited in claim 15, wherein none of said acoustic signal segments is of known distinct acoustic source prior to initiation of the training system mode, said sparse decomposition and discriminant reduction units thereby executing in the training system mode to cluster together similar ones of said segments.

18. The method as recited in claim 15, wherein a plurality of sub-segments are delineated within each said segment;

wherein a parametric mean of said sparse decompositions over each said sub-segment is generated, each said sub-segment parametric mean being defined in terms of said representative set of decomposition atoms; and, wherein said simultaneous sparse approximation and parametric mean are carried out according to a greedy adaptive decomposition (GAD) process.

19. The method as recited in claim 18, wherein:

said spectrographic transformation includes a Short-Time-Fourier-Transform (STFT) process, and said spectral vectors are defined in a time-frequency domain; and, said sparse decompositions are each defined in a cepstral-frequency domain to generate a coefficient-weighted sum of said representative set of atoms.

20. The method as recited in claim 19, wherein said segments of acoustic signals include time-captured audio recordings of speech, and the distinct acoustic sources include individual speakers.

21. The method as recited in claim 20, wherein said GAD process references a Gabor type dictionary for representation of said sparse decomposition as a sparse adaptive tiling of a C-F plane.

22. The method as recited in claim 19, wherein said segments of acoustic signals include time-captured audio recordings of speech; and, the distinct acoustic sources include distinct groups of speakers, each distinct group of speakers having a predetermined shared attribute selected from the group consisting of: common language, common gender, common ethnicity, common idiosyncrasies, common verbal tendencies, and common exhibited stress level.

23. The method as recited in claim 19, wherein said segments of acoustic signals include time-captured audio recordings of non-verbal sounds emitted by sources selected from the group consisting of: non-human creatures, inanimate objects, machinery, and natural phenomena.

24. The method as recited in claim 19, wherein the capturing of at least one of the input unconstrained acoustic signals is performed by a mobile communication device, and wherein at least one of the unit operations of spectrographic transformation, sparse decomposition, discriminant reduction, and classification is performed by said mobile communication device.

25. A non-transitory computer readable medium storing a computer program that when executed causes a processor to perform the method of claim 19.

26. A system for distinguishing a source from unconstrained acoustic signals captured thereby in context-agnostic manner, comprising:

(a) a transformation unit applying a Short-Time-Fourier-Transform (STFT) process upon each time-captured segment of unconstrained acoustic signal generated by one of a plurality of distinct acoustic sources, said transformation unit generating a spectral vector defined in a time-frequency plane for each said segment;

(b) a training unit coupled to said transformation unit, said training unit including:

a cepstral decomposition portion executing a simultaneous sparse approximation upon a joint corpus of spectral vectors for a plurality of unconstrained acoustic signal segments from at least a subset of the distinct acoustic sources, at least one of said spectral vectors generated by the STFT process, said simultaneous sparse approximation including a greedy adaptive decomposition (GAD) process referencing a Gabor dictionary, said cepstral decomposition portion generating for each said spectral vector in said joint corpus at least one cepstral decomposition defined on a cepstral-frequency plane as a coefficient weighted sum of a representative set of decomposition atoms; and, a discriminant reduction portion coupled to said cepstral decomposition portion, said discriminant reduction portion being executable to down-select from said representative set of decomposition atoms an optimal combination of atoms for cooperatively distinguishing acoustic signals emitted by different ones of the distinct acoustic sources;

(c) a classification unit coupled to said transformation unit, said classification unit including:

a cepstral projection portion projecting a spectral vector of an input acoustic signal segment onto said cepstral-frequency plane to generate a cepstral decomposition therefor as a coefficient weighted sum of said representative set of decomposition atoms; and, a classification decision portion coupled to said cepstral projection portion, said classification decision portion being executable to discover for said cepstral decomposition of said input acoustic signal segment a degree of similarity relative to each of the distinct acoustic sources, and to thereby determine one of the distinct acoustic sources to have generated the input acoustic signal segment as sound, according to the degree of similarity.

27. The system as recited in claim 26, wherein said segments of acoustic signals include time-captured audio recordings of speech, and the distinct acoustic sources include individual speakers.

28. The system as recited in claim 27, wherein said discriminant reduction portion includes a Support Vector Machine (SVM) part programmably implemented therein, said SVM part pair-wise comparing the distinct acoustic sources in cepstral decomposition to selectively determine said optimal combination of atoms for each said pair-wise comparison.

29. The system as recited in claim 28, wherein said SVM part determines for each said pair-wise comparison of sources a two-dimensional decision subspace defined by a corresponding pair of optimal atoms; and, said classification decision portion executes a non-parametric voting process iteratively mapping corresponding portions of said input acoustic signal segment cepstral decomposition to each said decision subspace.

30. A system for distinguishing between a plurality of acoustic sources generating sound in the form of unconstrained acoustic signals captured therefrom, comprising:

a transformation unit applying a spectrographic transformation upon each time-captured segment of unconstrained acoustic signal generated by one of a plurality of distinct acoustic sources, said transformation unit generating a spectral vector for each said segment;

a sparse decomposition unit coupled to said transformation unit, said sparse decomposition unit selectively executing in at least a training system mode a simultaneous sparse approximation upon a joint corpus of spectral vectors for a plurality of unconstrained acoustic signal segments from at least a subset of the distinct acoustic sources, at least one of said spectral vectors generated by the spectrographic transformation, said sparse decomposition unit generating at least one sparse decomposition defined on a two-dimensional plane for each said spectral vector in terms of a representative set of decomposition atoms;

a discriminant reduction unit coupled to said sparse decomposition unit, said discriminant reduction unit being executable during the training system mode to down-select from said representative set of decomposition atoms an optimal combination of atoms for cooperatively distinguishing acoustic signals emitted by different ones of the distinct acoustic sources based on characteristics of the acoustic signals independent of contextually-determined data content; and, a classification unit coupled to said sparse decomposition unit, said classification unit being executable in a classification system mode to:
  project a spectral vector of an input acoustic signal segment onto said two-dimensional plane to generate a sparse decomposition therefor as a coefficient weighted sum of said representative set of decomposition atoms,
  discover for said sparse decomposition of an input acoustic signal segment a degree of similarity between the representative set of decomposition atoms of the signal segment and the optimal combination of atoms of each of the distinct acoustic sources, and
  determine one of the distinct acoustic sources to have generated the input acoustic signal segment as sound, according to the degree of similarity.

31. The system as recited in claim 30, wherein:
said discriminant reduction unit includes a Support Vector Machine (SVM) portion programmably implemented therein, said SVM portion pair-wise comparing the distinct acoustic sources in sparse decomposition to selectively determine said optimal combination of atoms for each said pair-wise comparison; and,
said SVM portion determines for each said pair-wise comparison of sources a two-dimensional decision subspace defined by a corresponding pair of optimal atoms; and, said classification unit executes a non-parametric voting process iteratively mapping corresponding portions of said input acoustic signal segment sparse decomposition to each said decision subspace.

32. The system as recited in claim 31, wherein said simultaneous sparse approximation and parametric mean are carried out according to a greedy adaptive decomposition (GAD) process.

* * * * *